(12) United States Patent
Shen et al.

(10) Patent No.: US 9,769,488 B2
(45) Date of Patent: Sep. 19, 2017

(54) METHODS AND APPARATUSES FOR 3D MEDIA DATA GENERATION, ENCODING, DECODING AND DISPLAY USING DISPARITY INFORMATION

(71) Applicant: Panasonic Intellectual Property Corporation of America, Torrance, CA (US)

(72) Inventors: Sheng Mei Shen, Singapore (SG); Pongsak Lasang, Singapore (SG); Chong Soon Lim, Singapore (SG); Toshiyasu Sugio, Osaka (JP); Takahiro Nishi, Nara (JP); Hisao Sasai, Osaka (JP); Youji Shibahara, Osaka (JP); Kyoko Tanikawa, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 138 days.

(21) Appl. No.: 14/361,778

(22) PCT Filed: Feb. 1, 2013

(86) PCT No.: PCT/JP2013/000556
§ 371 (c)(1),
(2) Date: May 30, 2014

(87) PCT Pub. No.: WO2013/114887
PCT Pub. Date: Aug. 8, 2013

(65) Prior Publication Data
US 2014/0328405 A1 Nov. 6, 2014

Related U.S. Application Data

(60) Provisional application No. 61/594,046, filed on Feb. 2, 2012.

(51) Int. Cl.
*H04N 19/70* (2014.01)
*H04N 19/51* (2014.01)
(Continued)

(52) U.S. Cl.
CPC ......... *H04N 19/51* (2014.11); *H04N 13/0048* (2013.01); *H04N 13/0066* (2013.01);
(Continued)

(58) Field of Classification Search
None
See application file for complete search history.

(56) References Cited

U.S. PATENT DOCUMENTS

| 8,451,890 B2 | 5/2013 | Lim et al. |
| 8,548,040 B2 | 10/2013 | Lim et al. |

(Continued)

FOREIGN PATENT DOCUMENTS

| CN | 102210154 | 10/2011 |
| CN | 102342119 | 2/2012 |

(Continued)

OTHER PUBLICATIONS

International Search Report and Written Opinion of the International Searching Authority issued Apr. 23, 2013 in corresponding International Application No. PCT/JP2013/000556.
(Continued)

*Primary Examiner* — Kevin McInnish
(74) *Attorney, Agent, or Firm* — Wenderoth, Lind & Ponack, L.L.P.

(57) ABSTRACT

The current invention provides methods for 3D content capturing, 3D content coding and packaging at content production side, and 3D content consuming and rendering at display or terminal side, in order to ensure healthy and effective 3D viewing all the time. According to the current invention, maximum disparity and 3D budget, which are
(Continued)

scene dependent, are calculated, utilized for coding and embedded in the coded streams or media file, and checked against the allowable values during the content rendering, so to determine if the same 3D content can be shown to the user according to the viewing condition which the user has. In the case where a healthy 3D viewing guideline cannot be met, it is suggested to adjust the 3D content for its new maximum disparity and 3D budget to be within the allowable range, to achieve healthy and effective 3D viewing for that user with his/her viewing condition.

1 Claim, 34 Drawing Sheets

(51) Int. Cl.
H04N 13/00 (2006.01)
H04N 19/597 (2014.01)
H04N 19/52 (2014.01)
H04N 19/46 (2014.01)

(52) U.S. Cl.
CPC ........... *H04N 19/52* (2014.11); *H04N 19/597* (2014.11); *H04N 19/70* (2014.11); *H04N 19/46* (2014.11)

(56) References Cited

U.S. PATENT DOCUMENTS

| | | | |
|---|---|---|---|
| 8,553,761 B2 | 10/2013 | Lim et al. | |
| 8,577,208 B2 | 11/2013 | Ikeuchi et al. | |
| 8,848,036 B2 | 9/2014 | Tsukagoshi | |
| 8,860,782 B2 | 10/2014 | Tsukagoshi | |
| 8,860,786 B2 | 10/2014 | Tsukagoshi | |
| 8,937,642 B2 | 1/2015 | Tsukagoshi | |
| 8,963,995 B2 | 2/2015 | Tsukagoshi | |
| 8,964,859 B2 | 2/2015 | Ikeuchi et al. | |
| 2005/0254575 A1* | 11/2005 | Hannuksela | H04N 19/70 375/240.1 |
| 2010/0266010 A1 | 10/2010 | Lim et al. | |
| 2010/0290483 A1* | 11/2010 | Park | H04N 13/0062 370/472 |
| 2011/0134210 A1 | 6/2011 | Tsukagoshi | |
| 2011/0134213 A1 | 6/2011 | Tsukagoshi | |
| 2011/0141232 A1 | 6/2011 | Tsukagoshi | |
| 2011/0141233 A1 | 6/2011 | Tsukagoshi | |
| 2011/0141234 A1 | 6/2011 | Tsukagoshi | |
| 2011/0141235 A1 | 6/2011 | Tsukagoshi | |
| 2011/0141238 A1 | 6/2011 | Tsukagoshi | |
| 2011/0149024 A1 | 6/2011 | Tsukagoshi | |
| 2011/0149034 A1 | 6/2011 | Tsukagoshi | |
| 2011/0149035 A1 | 6/2011 | Tsukagoshi | |
| 2011/0242297 A1 | 10/2011 | Yamada | |
| 2011/0280552 A1 | 11/2011 | Ikeuchi et al. | |
| 2012/0019618 A1 | 1/2012 | Lim et al. | |
| 2012/0020414 A1 | 1/2012 | Lim et al. | |
| 2012/0050473 A1* | 3/2012 | Suh | H04N 5/44543 348/43 |
| 2012/0120210 A1 | 5/2012 | Yamada | |
| 2012/0249735 A1 | 10/2012 | Tsukagoshi | |
| 2012/0257014 A1 | 10/2012 | Tsukagoshi | |
| 2013/0010069 A1* | 1/2013 | Raju | H04N 19/597 348/46 |
| 2013/0194395 A1* | 8/2013 | Hannuksela | G02B 27/225 348/51 |
| 2013/0343469 A1 | 12/2013 | Ikeuchi et al. | |
| 2014/0053220 A1 | 2/2014 | Tsukagoshi | |
| 2014/0053224 A1 | 2/2014 | Tsukagoshi | |
| 2014/0192165 A1* | 7/2014 | Norkin | H04N 13/0048 348/47 |

FOREIGN PATENT DOCUMENTS

| | | |
|---|---|---|
| JP | 2011-211657 | 10/2011 |
| WO | 2010/082508 | 7/2010 |
| WO | 2011/037933 | 3/2011 |

OTHER PUBLICATIONS

Office Action issued Dec. 2, 2015 in corresponding Chinese Patent Application No. 201380004025.2 (with English translation of Search Report).

* cited by examiner

Fig. 20

Video stream (PID=0x1011, Primary video)

Audio stream (PID=0x1100)

Audio stream (PID=0x1101)

Presentation graphics stream (PID=0x1200)

Presentation graphics stream (PID=0x1201)

Interactive graphics stream (PID=0x1400)

Video stream (PID=0x1B00, Secondary video)

Video stream (PID=0x1B01, Secondary video)

| Corresponding standard | Driving frequency |
|---|---|
| MPEG-4 AVC | 500 MHz |
| MPEG-2 | 350 MHz |
| ⋮ | ⋮ | ex900

METHODS AND APPARATUSES FOR 3D MEDIA DATA GENERATION, ENCODING, DECODING AND DISPLAY USING DISPARITY INFORMATION

TECHNICAL FIELD

This invention can be used in multimedia data coding, delivery, and presentation, more particularly, in 3D image and video packaging and delivery, where disparity or depth information is processed, extracted, and utilized for 3D viewing with healthy and effective 3D and also for other than viewing purpose.

BACKGROUND ART

State-of-the-art stereo or 3D video coding scheme like MVC (Multiple-View Video Coding), encode stereo views (Left and Right) into a stream and deliver to a terminal for viewing or other purposes. The terminal side will decode the stream and render to a display in the right order of the Left and Right for 3D viewing, or decode the stream for further editing before the content consumption.

It is found that a healthy 3D viewing experience is always affected by such factors like mis-alignment between each views, viewing distance, display size, and minimum and maximum disparity values corresponding to the viewing distance and display size, etc.

There is always complaint about 3D health issues due to un-known 3D content quality, which is only one issue, but also un-known 3D content characteristics, for example too large of a 3D budget beyond what our human eye can endure based on the fixed viewing distance and display size, etc. 3D budget can be obtained from the difference between maximum disparity and minimum disparity values. Complaint could also come from too much pop-up for our eye to endure based on the fixed viewing distance and display size, etc. Too much pop-up is the result of too large of a value of the maximum disparity.

3D budget or maximum or minimum disparity can be calculated from 3D content but the accuracy of the values is not either easily guaranteed or it is involved in intensive computation. So it is expected such values could be generated at the content creation side, for example during 3D movie making stage. However based on the state-of-the art, such values are not well prepared during 3D production, or 3D content packaging and delivery, or not well utilized for content consumption, for example, with these values to guide the terminal to render the 3D content to match with the viewing condition.

For example, 3D Movie production is to make 3D content with the specific characteristics to match with the viewing condition of the movie theaters, while when such content is displayed on home 3DTV or portable device, it would be mis-matched which will cause unhealthy 3D viewing. For personal 3D, it is even worse, as there is no rule and no mechanism to guide consumers to capture a healthy 3D which can fit to their viewing condition on home 3DTV or Portable 3D device. As a result, so-called bad 3D viewing experience will happen (like eye strain and headache issue, etc.).

In the state-of-the art camera parameters like baseline and convergent angle between the two cameras are often available and also possible to be carried with the 3D content to help informing the terminal about the 3D content's characteristics, however it alone cannot tell 3D budget and maximum or minimum disparity of each scene as object distance from the camera can be different for difference scenes, and some may be very close to the camera so to have very big disparity to result in unhealthy 3D viewing while some could be very small so to see flat object like 2D content.

There is a demand and need to establish the right 3D capturing mechanism, the corresponding 3D content packaging format, and 3D viewing method to always bring healthy 3D content to users.

SUMMARY OF INVENTION

Technical Problem

When 3D content is captured, it is hard to predict what kind of 3D characteristics are good to fit to a 3D viewing condition as such content could be viewed by various users with various displays and different view distances, especially for personal 3D contents.

An end-user may want to combine different 3D contents to view, for example a 3D photo slide show, but those 3D photos may contain different 3D characteristics like 3D budget or maximum disparity which may exceed the allowable or healthy range, and also sudden 3D budget transition between photos could cause discomfort and unhealthy viewing experience. This situation will be the same for 3D video combination, or insertion of 3D advertisement images into a 3D video.

The problem with the prior art is that a healthy 3D capture mechanism is not established, the corresponding packaging format with well-considered 3D content characteristics is not provided, and an intelligent way for a 3D content viewing method using the 3D content's characteristics is not developed.

Solution to Problem

To solve the problem, a new method of 3D content creation including 3D capturing is introduced, to create 3D with 3D characteristics embedded in the content either utilizing camera parameters or fully calculated from 3D content itself.

To solve the problem, a new method of 3D content packaging and delivery is introduced, including 3D image coding format and 3D video coding format, to serve as metadata of 3D content, or as the header of 3D content format, or as part of 3D image and video data.

To solve the problem, a new method of 3D content consumption or rendering is introduced by utilizing the corresponding 3D content coding format, which includes 3D content receiving and decoding, 3D characteristics extraction, and 3D content modification for healthy viewing or re-creation for other than viewing purpose.

Advantageous Effects of Invention

The effect of the current invention is to create and deliver 3D content with the valuable 3D characteristics to describe each 3D scene so to bring pleasant and healthy 3D viewing experience by utilizing such valuable 3D characteristics to match different viewing conditions with the different 3D contents.

BRIEF DESCRIPTION OF DRAWINGS

FIG. 20 illustrates a structure of multiplexed data.

DESCRIPTION OF EMBODIMENTS

Figure 1:
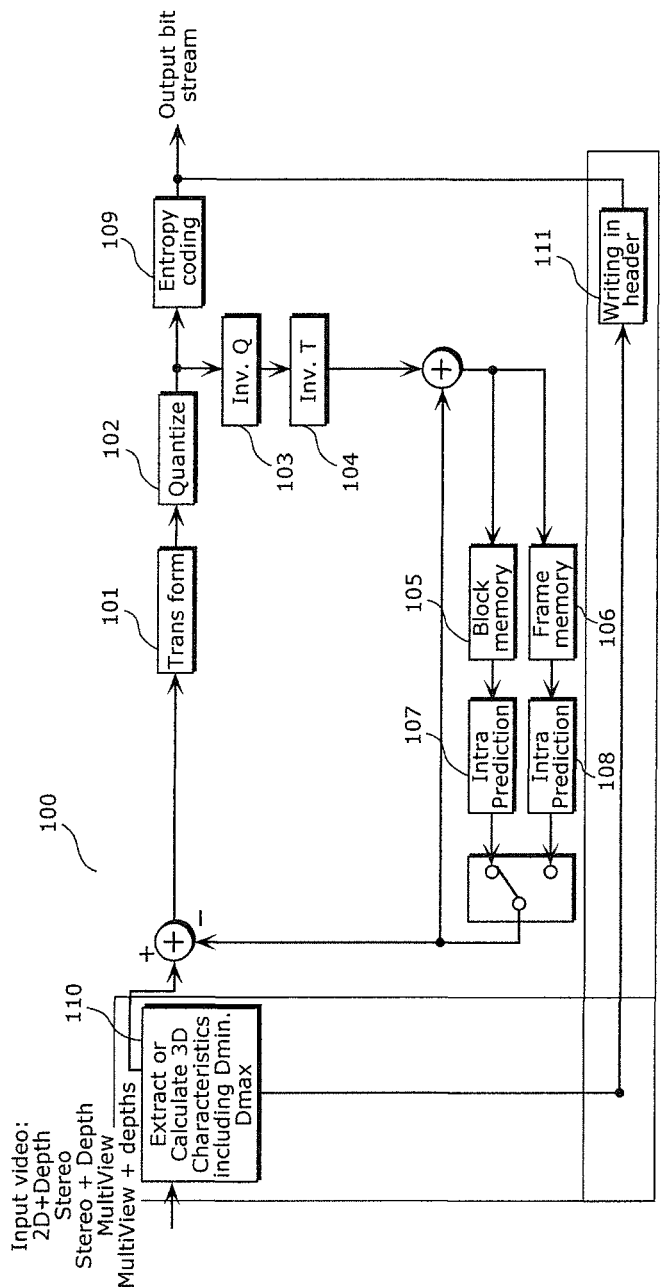
FIG. 1 shows a block diagram illustrating an example apparatus for a video encoder of current invention.

Embodiment:Video Encoder Block Diagram:

FIG. 1 is a block diagram which shows a structure of video/image encoding apparatus in an embodiment of the present invention.

The video encoding apparatus is an apparatus for encoding an input video/image bit stream on a block-by-block basis so as to generate an encoded output bit stream. As shown in FIG. 1, the apparatus comprises of a transformation unit 101, a quantization unit 102, an inverse quantization unit 103, an inverse transformation unit 104, a block memory 105, a frame memory 106, an intra prediction unit 107, an inter prediction unit 108, an entropy coding unit 109, 3D characteristics data extraction or generation unit 110, and a video data header writing unit 111 where the 3D characteristics data including Dmin and Dmax are embedded in the header of a video bit stream. Dmax is the maximum disparity of this scene and Dmin is the minimum disparity of this scene.

An input video which can be 2D or 2D with Depth, Stereo or Stereo with Depths. Multi-view 3D or Multi-view 3D with Depths, is inputted to the unit 110 where 3D characteristics data will be extracted or generated especially for Dmin and Dmax, from input video content.

Dmin and Dmax could be generated from one of the following ways: 1) obtained during 3D movie capturing by using distance or depth sensor from the nearest object and farthest object in a scene; 2) obtained during 3D movie capturing by calculating the disparity from a pair of video for a scene; and 3) generated during 3D packaging from camera parameters together with the video scene, or calculated from 3D data itself with/without depth, or just simply extracted from part of input data, which is pre-generated and attached to the input video. Dmin and Dmax are written by the writing unit 111 together with other 3D characteristics data and embedded into the headers of a bit stream.

After the blocks of pixels are input to an adder, blocks of added values are output to the transformation unit 101. The transformation unit 101 transforms the added values into frequency coefficients, and outputs the resulting frequency coefficients to the quantization unit 102. The quantization unit 102 quantizes the inputted frequency coefficients, and outputs the resulting quantized values to the inverse quantization unit 103 and the entropy coding unit 109. The entropy coding unit 109 encodes the quantized values outputted from the quantization unit 102, and outputs a bit stream.

The inverse quantization unit 103 inversely quantizes the sample values outputted from the quantization unit 102, and outputs the frequency coefficients to the inverse transformation unit 104. The inverse transformation unit 104 performs inverse frequency transform on the frequency coefficients so as to transform the frequency coefficients into sample values of the bit stream, and outputs an adder. The adder adds the sample values of the bit stream outputted from the inverse transformation unit 104 to the predicted video/image values outputted from the inter/intra prediction unit 107, 108, and outputs the resulting added values to the bock memory 105 or the frame memory 106 for further prediction. The inter/intra prediction unit 107, 108 searches within reconstructed videos/images stored in the block memory 105 or the frame memory 106, and estimates a video/image area which is e.g. most similar to the input videos/images for prediction.

Besides Dmin and Dmax, 3D Characteristics could also include the following camera parameters: intrinsic and extrinsic camera parameters, baseline between cameras, focal lens value of each camera, and convergence angle between each pair of cameras, and these parameters are carried in the sequence header to reflect the same 3D Characteristics for that group of picture under the same capturing condition. Such parameters will be extracted and used in the decoder and terminal for 3D content editing, 3D rendering, or 3D based sensing purpose.

Embodiment (I): Syntax

Figure 5:
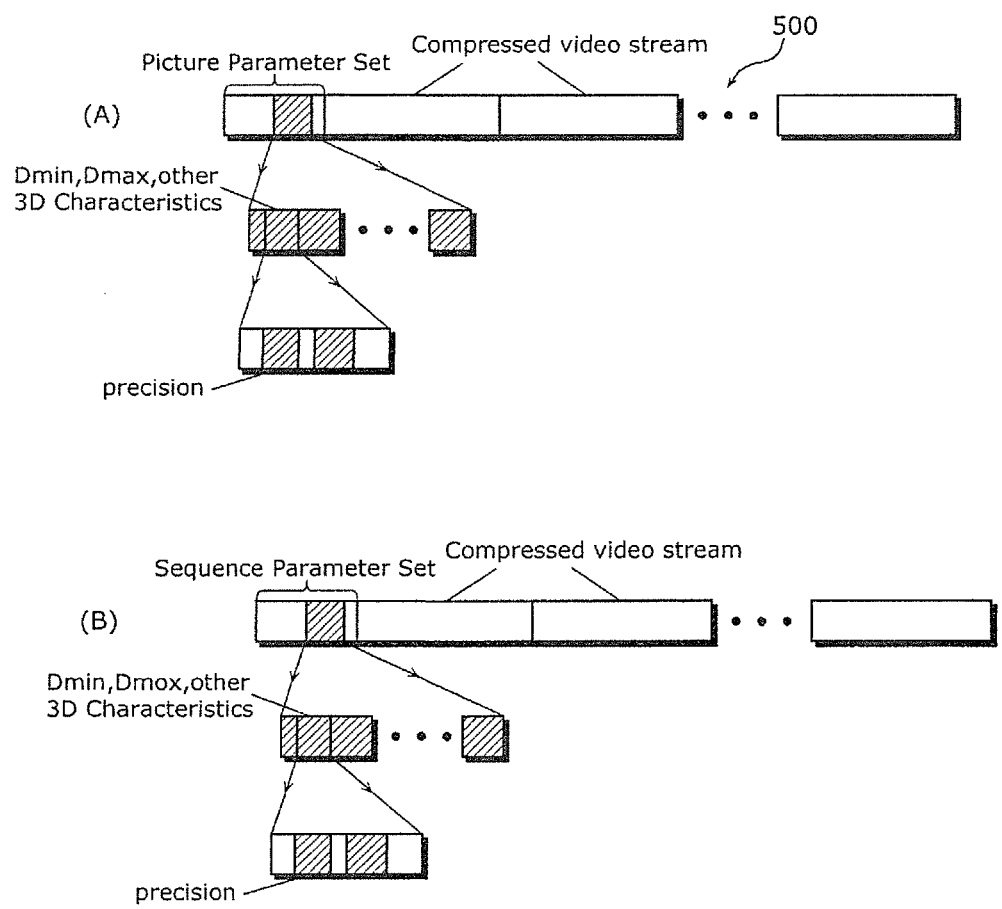
FIG. 5 shows a diagram showing the locations of the Dmin and Dmax in a (A) picture parameter set, (B) a sequence parameter set in a compressed video stream.

FIG. 5 is a syntax diagram which shows of locations of the 3D Characteristics parameter especially Dmin and Dmax for each picture or each sequence in example embodiments of the present invention.

In FIG. 5 (A), the 3D Characteristics parameters, especially Dmin and Dmax, can be located in a picture parameter set. The 3D Characteristics parameters, especially Dmin and Dmax in the picture parameter set, comprises of Dmin and Dmax and their precisions for each picture.

In FIG. 5 (B), the 3D Characteristics parameters including Dmin and Dmax can be located in a sequence parameter set. The 3D Characteristics parameters including Dmin and Dmax in the sequence parameter set comprises of Dmin and Dmax and their precisions for each sequence to represent the average Dmin and Dmax for a group of pictures in the sequence.

Figure 6:
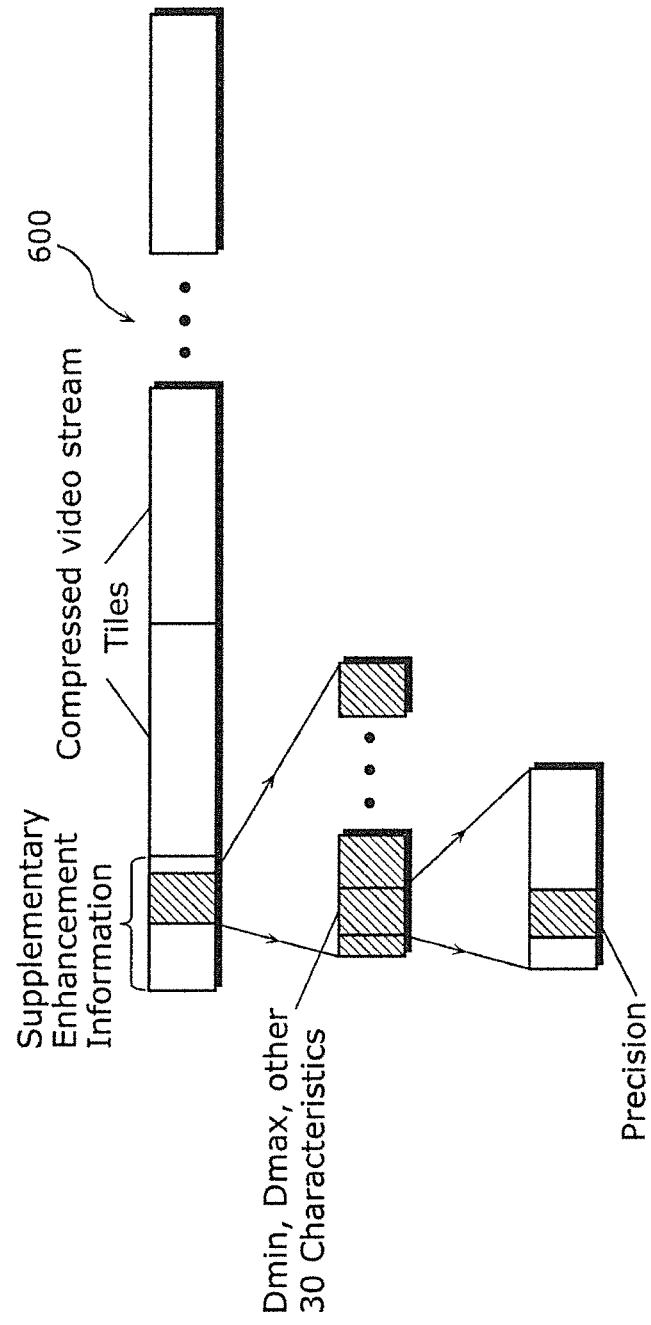
FIG. 6 shows a diagram showing the locations of Dmin, Dmax and 3D Characteristics in a SEI (Supplementary Enhancement Information) message in a compressed video stream.

In FIG. 6 is a syntax diagram, showing the location of the 3D Characteristics parameters in supplementary enhancement information message. The 3D Characteristics parameters in supplementary enhancement information message comprises of Dmin and Dmax with their precisions besides camera parameters for effective 3D encoding and decoding and as well as 3D rendering.

Dmnin and Dmax can be utilized in coding of depth image by shifting to the mean disparity value of each depth pixel to reduce the dynamic range of the disparity value so to save coding bits;

Let Dmean represent the mean value of disparity for a scene, and it can be derived from Dmin and Dmax for the scene, Dmean=(Dmax−Dmin)/2;

During the depth generation process for the whole image, if we know Dmin and Dmax of the image, we can set the search window size to maximum bounded by Dmax to find each depth/disparity value for each image pixel, which not only can reduce computation in depth generation but also no possible missing correct depth values.

Next, a description is given as to the operations of the video coding apparatus 100 as mentioned above.

Figure 7:
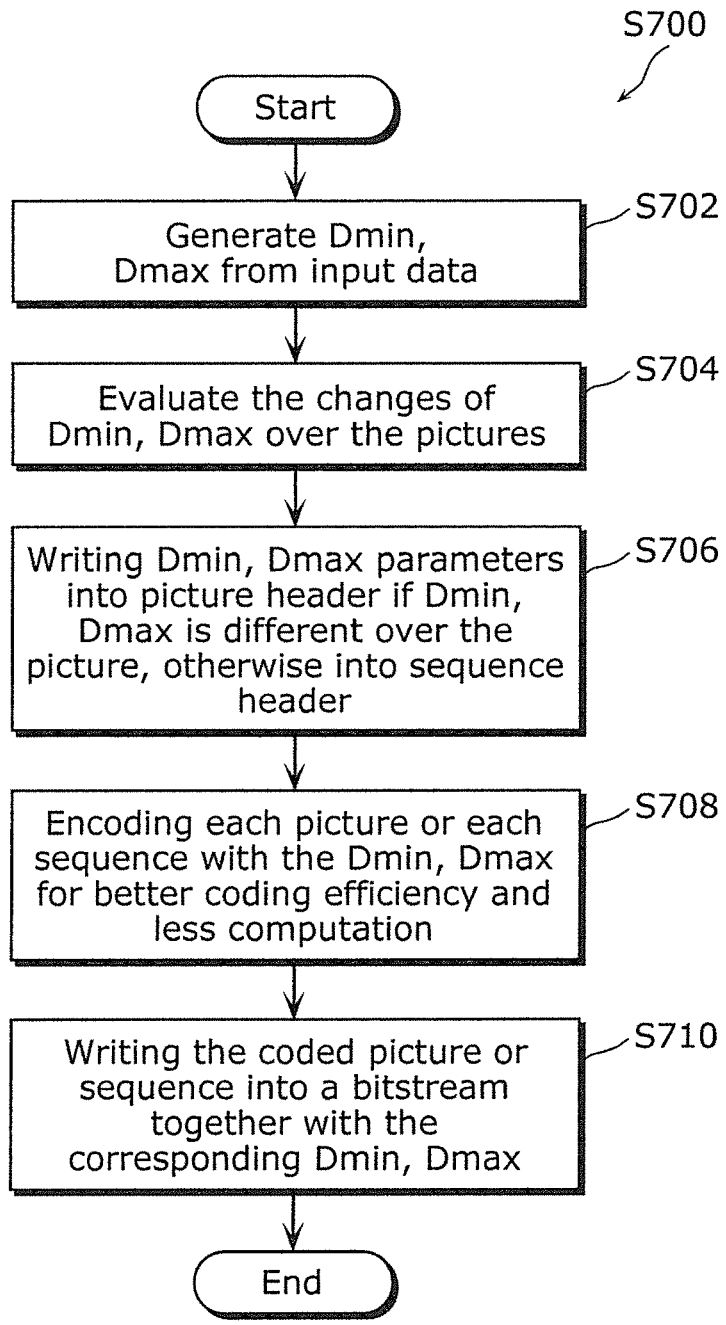
FIG. 7 shows a flowchart showing video encoding process to use and embed Dmin and Dmax in a video stream.

Embodiment(I): Encoding Flow Chart:

FIG. 7 is a flowchart (S700) which shows a sequence of operations for encoding method/steps of the video/image encoding apparatus 100 in the embodiment of the present invention.

At Step S702, 3D Characteristics especially Dmin and Dmax are generated from the input data. At Step S704, the changes of Dmin and Dmax are evaluated over the pictures to see if they are almost the same over a group of pictures. Then, at Step S706, the generated Dmin and Dmax are written into the header of picture if there is change of Dmin and Dmax over the pictures, otherwise written into the header of sequence. And, at Step S708, encoding each picture or sequence using Dmin and Dmax so to improve coding efficiency and reduce computation of the coding process. Finally, in Step S710, coded pictures or sequences are written into a stream with the corresponding Dmin and Dmax placed in their headers.

Figure 9:
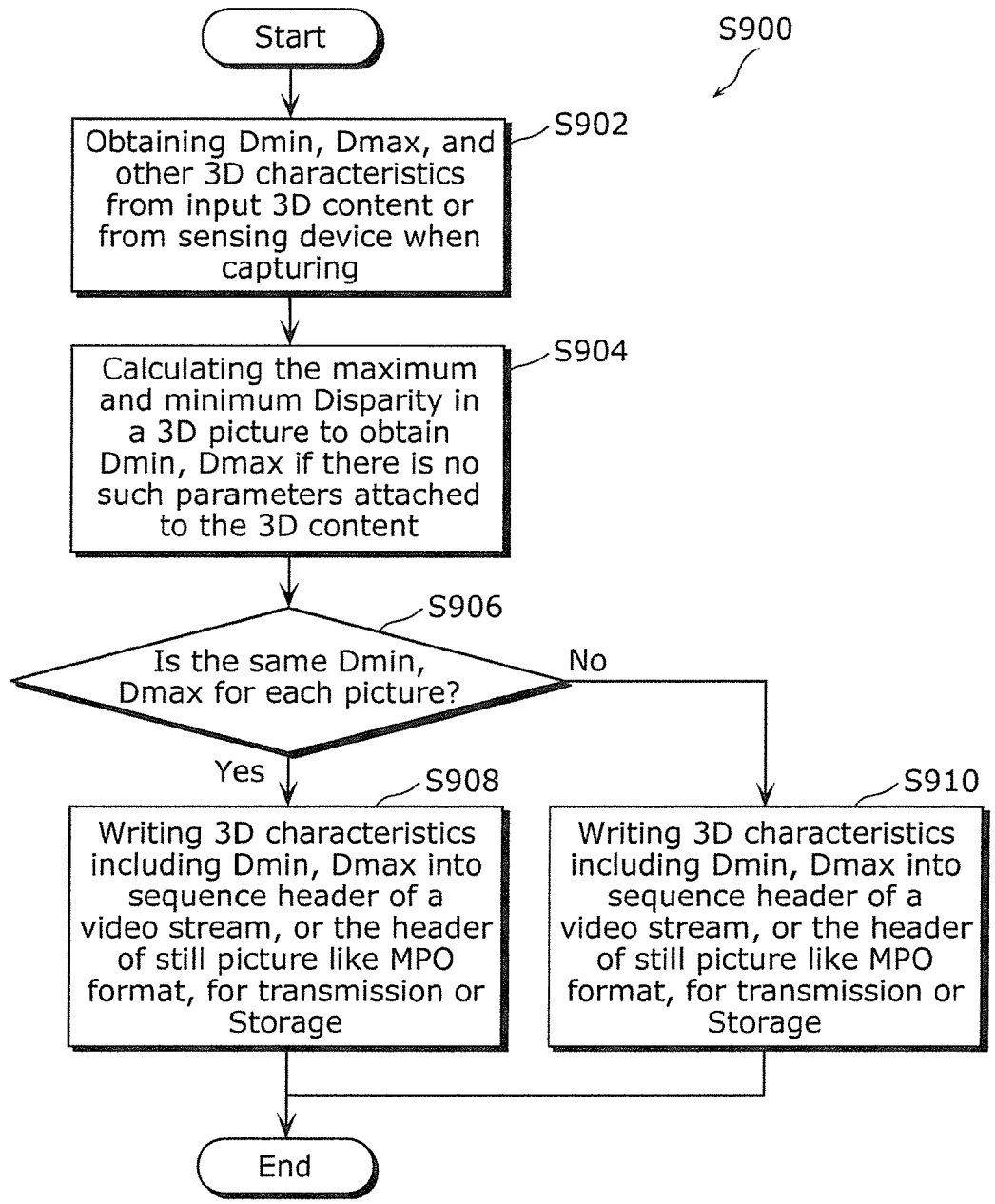
FIG. 9 shows a flowchart showing video or image encoding process for embedding Dmin and Dmax in the coded stream or packed file.

Embodiment (II): Encoding Flow Chart:

FIG. 9 is a flowchart (S900) which shows a sequence of operations for encoding method/steps of the video/image encoding apparatus 100 in the second embodiment of the present invention.

At Step S902, Dmin and Dmax are obtained by extracting the 3D characteristics data which is attached to the input 3D content. Dmin and Dmax can be obtained by a sensing device to measure the nearest and farthest object distance from the capture device during 3D content capturing.

If there is no Dmin and Dmax attached to the input 3D content, at Step S904, they can be obtained by calculating the maximum and minimum disparity for a picture or a sequence from the input 3D content by any means. At Step S906, Dmin and Dmax are checked if they are not changed across the neighbor pictures. If so, at Step S908 Dmin and Dmax, with other 3D Characteristic data, are written into the header of sequence of video stream for video coding like MPEG 3D format, or written into the header of a packaging unit for storage format like MPO (Multiple Picture Organization) for 3D still picture format which is used in 3D camera. Otherwise at Step 910, Dmin, Dmax with other 3D Characteristic data are written into the header of each picture of video stream for video coding like MPEG 3D format, or written into the header of a packaging unit for storage format like MPO (Multiple Picture Organization) for 3D still picture format which is used in 3D camera.

The effect of the current invention is that with known Dmin and Dmax, the encoder can be utilized for efficient coding, for example to encode the depth image by shifting each of depth pixel by the mean disparity value which is derived from Dmin and Dmax, and also for rendering to determine if such Dmin and Dmax are suitable for different view conditions therefore to ensure 3D healthy viewing for different view conditions which includes view distance, display size and image resolution, etc.

Figure 4:
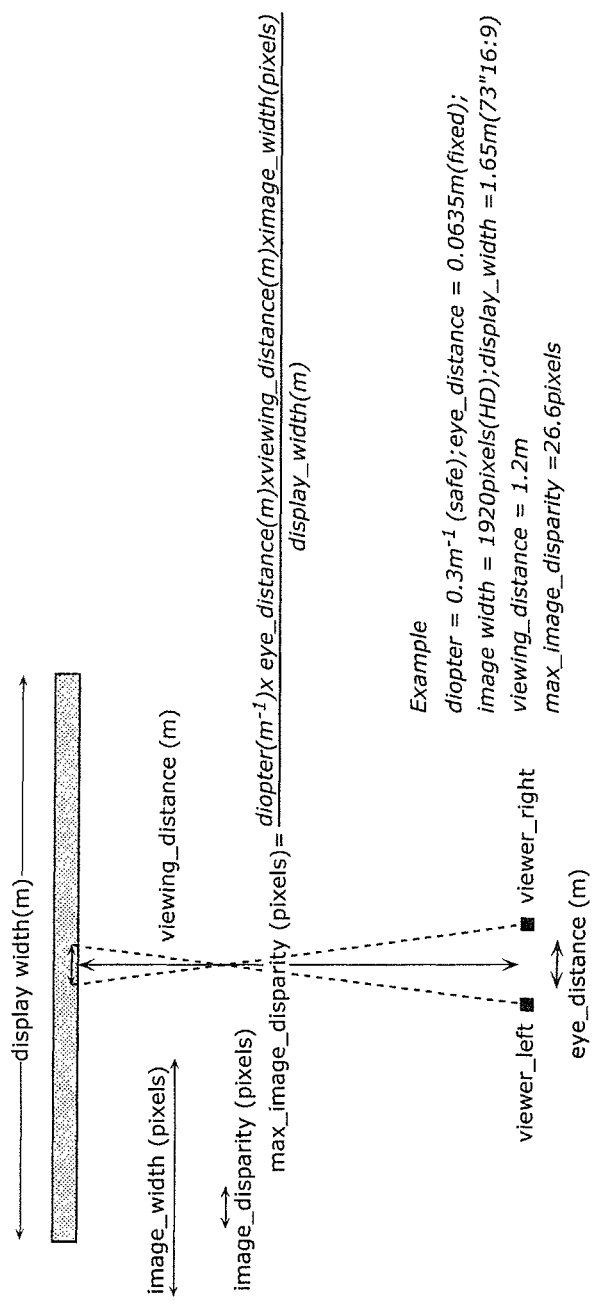
FIG. 4 shows a diagram illustrating Maximum Acceptable Disparity of our human eye based on certain view condition.

FIG. 4 is an illustration diagram to show the maximum acceptable/allowable disparity of our human eyes based on various view conditions.

Here max_image_disparity (in number of pixels) is the maximum image disparity that human eye can accept as healthy 3D viewing based on the combination of view conditions: viewing_distance, image_width, display_width, eye_distance, and diopter. The suggested formula is shown below:

$$\text{max\_imaged\_disparity(pixels)} = \\ \frac{\text{diopter}(m^{-1}) \times \text{eye\_distance}(m) \times \text{viewing\_distance}(m) \times \text{image\_width(pixels)}}{\text{display\_width}(m)} \quad \text{[Math. 1]}$$

Diopter and eye_distance can be fixed value, where eye_distance is the distance between the two eyes and there is difference between adults and children in general. So allowable maximum disparity will be determined by viewing_distance, display_width, image_width, where view_distance is the distance from our eyes to the screen in term of meters, display_width is the physical display size in horizontal direction in term of meters, and image_width is the image resolution in horizontal direction in number of pixels.

Figure 8A:
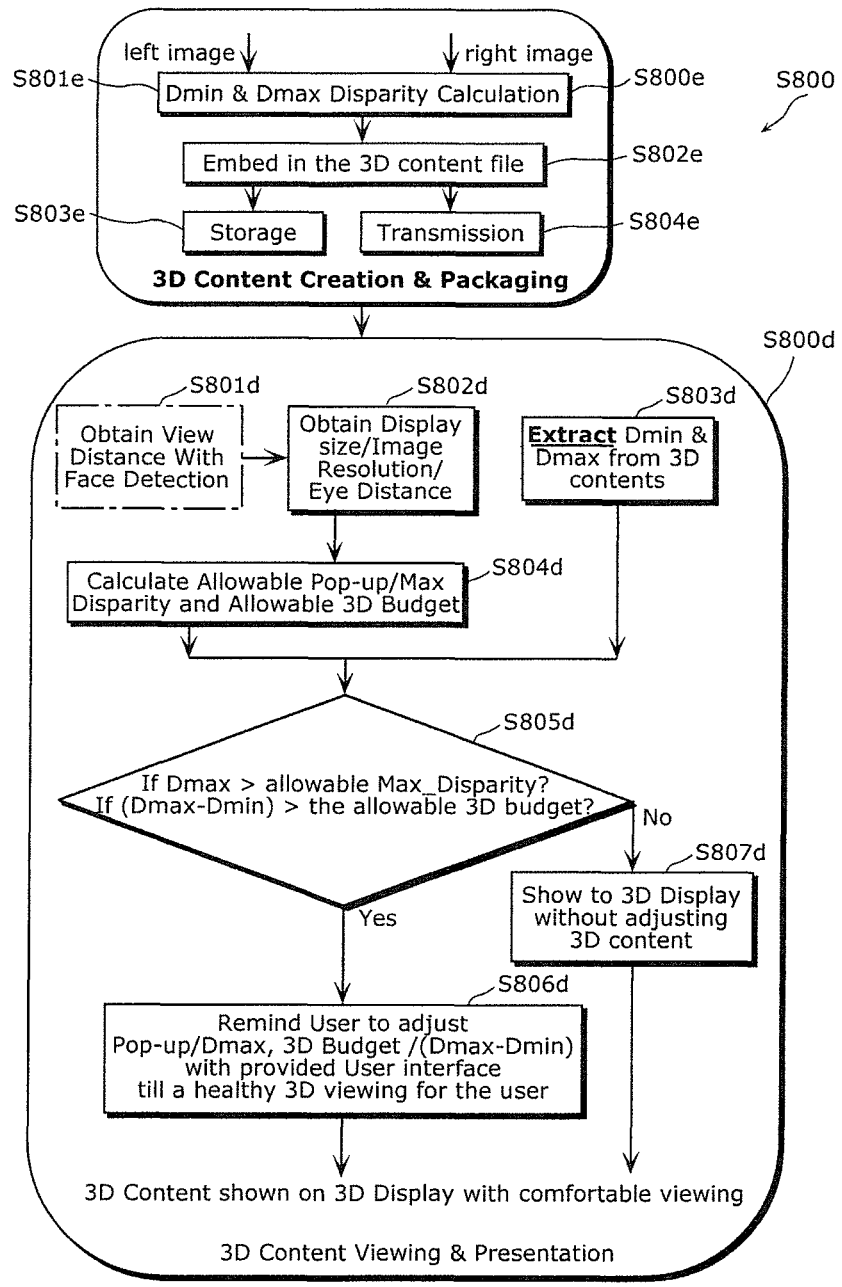
FIG. 8A shows a flowchart showing How Dmin and Dmax embedded in 3D content at encoding side, and How Dmin and Dmax are used for healthy 3D viewing at terminal side, manually adjusted through UI.

FIG. 8A is a flowchart to show how Dmin and Dmax are embedded in 3D content for storage and delivery, and how the embedded Dmin and Dmax are extracted from the corresponding 3D content coding stream or 3D content packaging file, together with other viewing parameters to determine if the extracted Dmin and Dmax need to adjust manually in order to provide user with a healthy 3D viewing experience.

The unit of S800e shows how Dmin and Dmax are embedded in 3D content coding stream or 3D content packaging file for storage or transmission. In the step of S801e Dmin and Dmax disparity are calculated then embed in 3D content file(coding stream or packaging file) in the step of S802e, for storage in the step of S803e or for transmission in the step of S804e.

In FIG. 8A the unit of S800d shows how the embedded Dmin and Dmax are used to determine if the same 3D content can provide user a healthy 3D viewing experience together with viewing parameters.

The step of S801d is to obtain view distance/viewing_distance by any means, for example using face detection to locate the face of viewer then measure the distance from the viewer to the display either by software or distance measurement device, and the step of S803d is to obtain Image Resolution/image_width, Display Size/ display_width, and Eye Distance which can be considered as fixed value, by user selection from TV parameter settings. The step of S803d is to extract the Dmin and Dmax which are carried in the 3D content stream or 3D packaged file.

Figure 13:
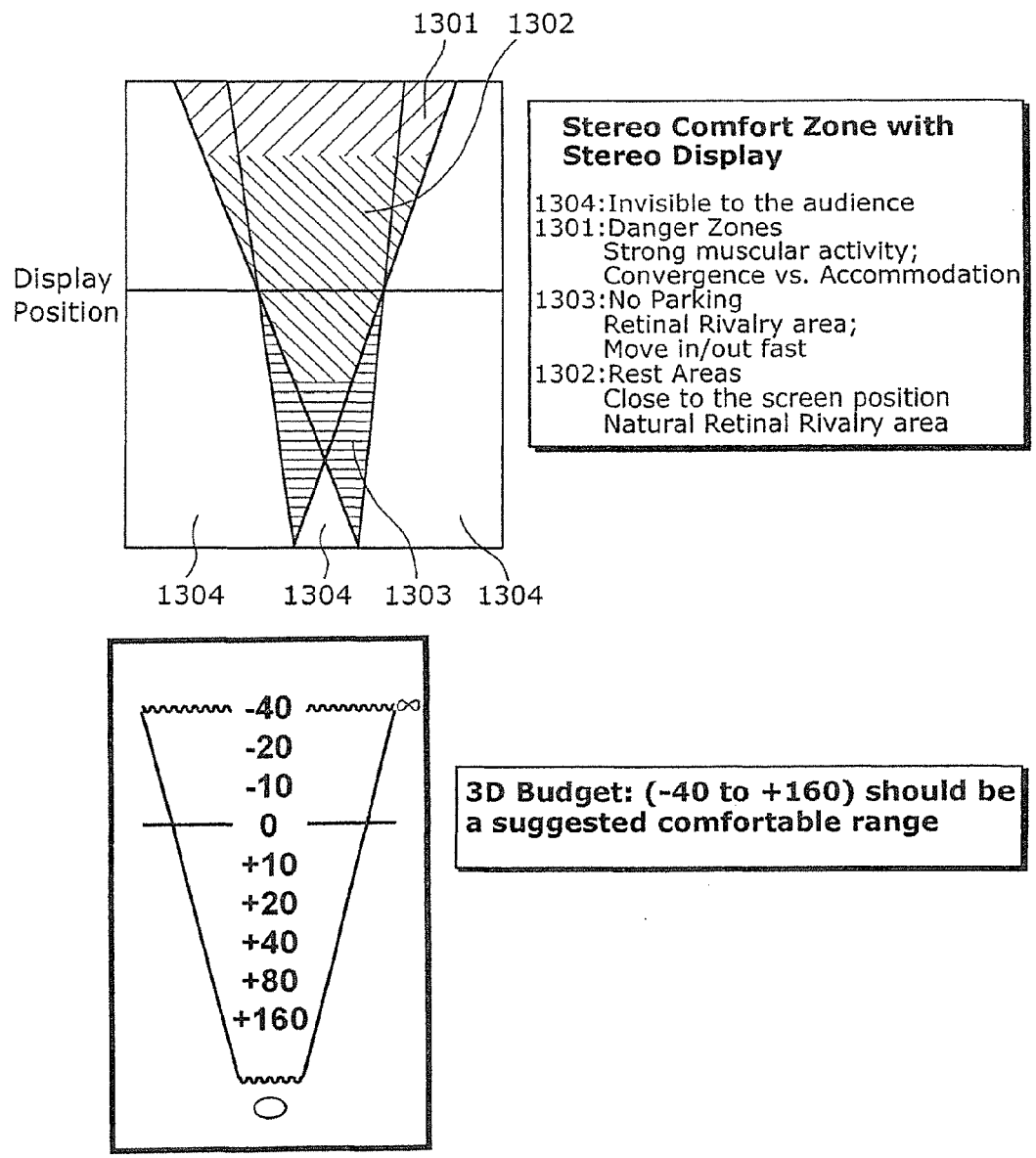
FIG. 13 shows a diagram to Illustrate Stereo Viewing Comfort Zone and 3D Budget.

The step of S804d is to calculate the allowable 3D pop-up which is corresponding to the maximum disparity, and the allowable 3D budget, where the calculation of the allowable maximum disparity is explained and illustrated in FIG. 4, and the allowable 3D budget can be obtained from the rule of 3D healthy viewing zones as shown in FIG. 13. According to the experiences from 3D movie makers it can be set as −40 pixels for deep-in and +160 pixels for pop-up as the strong 3D effect for HD resolution on 30" screen.

The step of S805d is to check if the extracted Dmax from the 3D content coding stream or 3D content packaging file is greater than the allowable maximum disparity which is calculated based on the viewing parameters shown in FIG. 4, and if yes, then the 3D content needs to be adjusted to make the new Dmax be within the allowable range for pop-up, which is done in the step of S806d-a to remind user to adjust the pop-up extent themselves by using either remote controller or other User Interface like hand gesture. Otherwise the 3D content can be shown to the 3D display in the step of S807d without adjustment as it is able to provide healthy 3D viewing.

For more strict rule of 3D healthy viewing, the same checking is further done for the (Dmax-Dmin), and if it is greater than the allowable 3D budget, then goes to S806d for 3D budget adjustment to reduce the (Dmax-Dmin) to be within the allowable 3D budget, where the reduction of the value of (Dmax-Dmin) may require high quality depth with accurate values to perform 3D rendering based on the given depth and 3D budget. If (Dmax-Dmin) is less than the allowable 3D budget at the step of S805d, i.e. within the healthy 3D viewing budget, then goes to S807d to show the 3D content without adjustment.

Figure 8B:
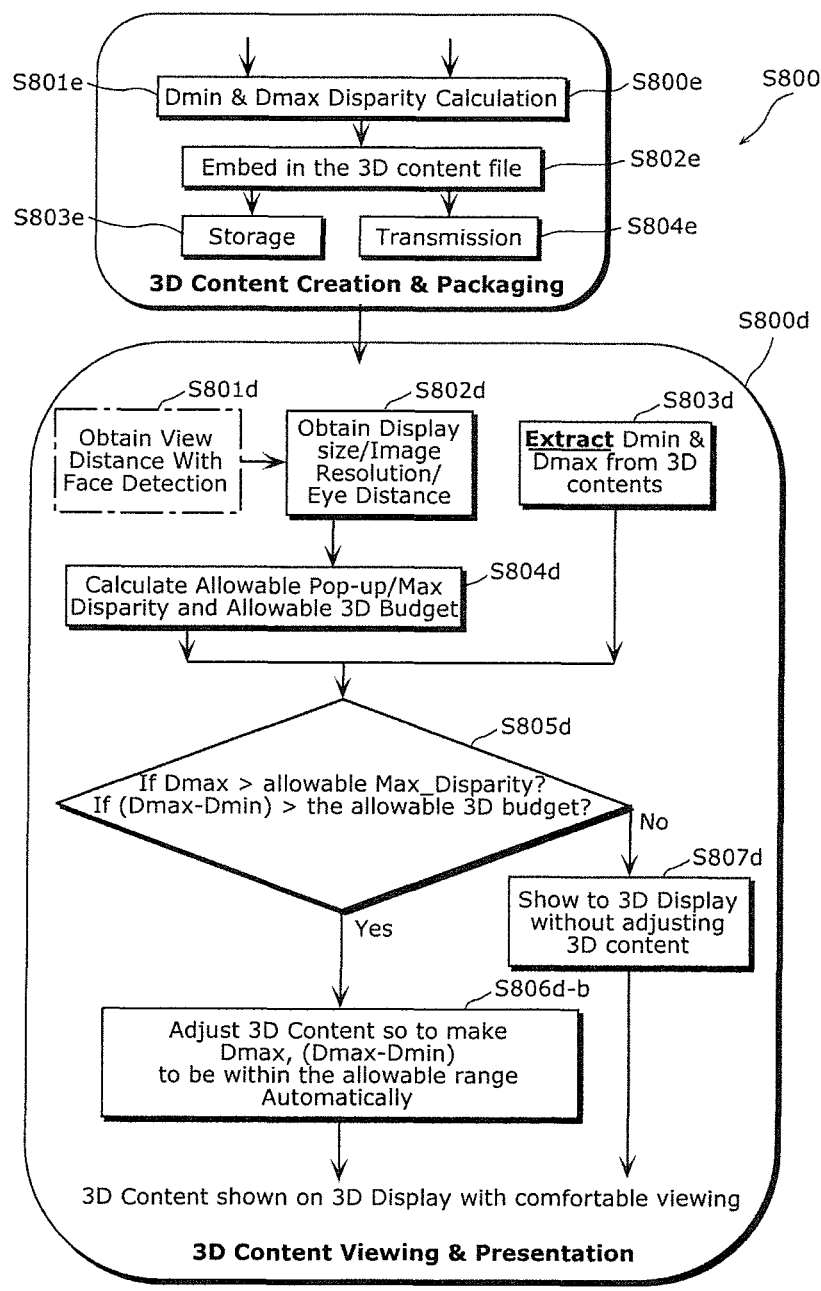
FIG. 8B shows a flowchart showing How Dmin and Dmax embedded in 3D content at encoding side, and How Dmin and Dmax are used for healthy 3D viewing at terminal side, in automatic way.

FIG. 8B is a flowchart to show how Dmin and Dmax are embedded in 3D content for storage and delivery, and how the embedded Dmin and Dmax are extracted from the corresponding 3D content coding stream or 3D content packaging file, together with other viewing parameters to determine if the extracted Dmin and Dmax need to adjust automatically in order to provide user with a healthy 3D viewing experience.

The unit of S800e shows how Dmin and Dmax are embedded in 3D content coding stream or 3D content packaging file for storage or transmission. In the step of S801e Dmin and Dmax disparity are calculated then embed in 3D content file(coding stream or packaging file) in the step of S802e, for storage in the step of S803e or for transmission in the step of S804e.

In FIG. 8B the unit of S800d shows how the embedded Dmin and Dmax are used to determine if the same 3D content can provide user a healthy 3D viewing experience together with viewing parameters.

The step of S801d is to obtain view distance/viewing_distance by any means, for example using face detection to locate the face of viewer then measure the distance from the viewer to the display either by software or distance measurement device, and the step of S803d is to obtain Image Resolution/image_width, Display Size/ display_width, and Eye Distance which can be considered as fixed value, by user selection from TV parameter settings. The step of S803d is to extract the Dmin and Dmax which are carried in the 3D content streamn or 3D packaged file.

The step of S804d is to calculate the allowable 3D pop-up which is corresponding to the maximum disparity, and the allowable 3D budget, where the calculation of the allowable maximum disparity is explained and illustrated in FIG. 4, and the allowable 3D budget can be obtained from the rule of 3D healthy viewing zones as shown in FIG. 13. According to the experiences from 3D movie makers it can be set as −40 pixels for deep-in and +160 pixels for pop-up as the strong 3D effect for HD resolution on 30" screen.

The step of S805d is to check if the extracted Dmax from the 3D content coding stream or 3D content packaging file is greater than the allowable maximum disparity which is calculated based on the viewing parameters shown in FIG. 4, and if yes, then the 3D content needs to be adjusted to make the new Dmax be within the allowable range for pop-up, which is done in the step of S806d-b automatically. Otherwise the 3D content can be shown to the 3D display in the step of S807d without adjustment as it is able to provide healthy 3D viewing.

For more strict rule of 3D healthy viewing, the same checking is further done for the (Dmax-Dmin), and if it is greater than the allowable 3D budget, then goes to S806d for 3D budget adjustment to reduce the (Dmax-Dmin) to be within the allowable 3D budget, where the reduction of the value of (Dmax-Dmin) may require high quality depth with accurate values to perform 3D rendering based on the given depth and 3D budget. If (Dmax-Dmin) is less than the allowable 3D budget at the step of S805d, i.e. within the healthy 3D viewing budget, then goes to S807d to show the 3D content without adjustment.

Embodiment: Decoder and 3D Terminal

Figure 2:
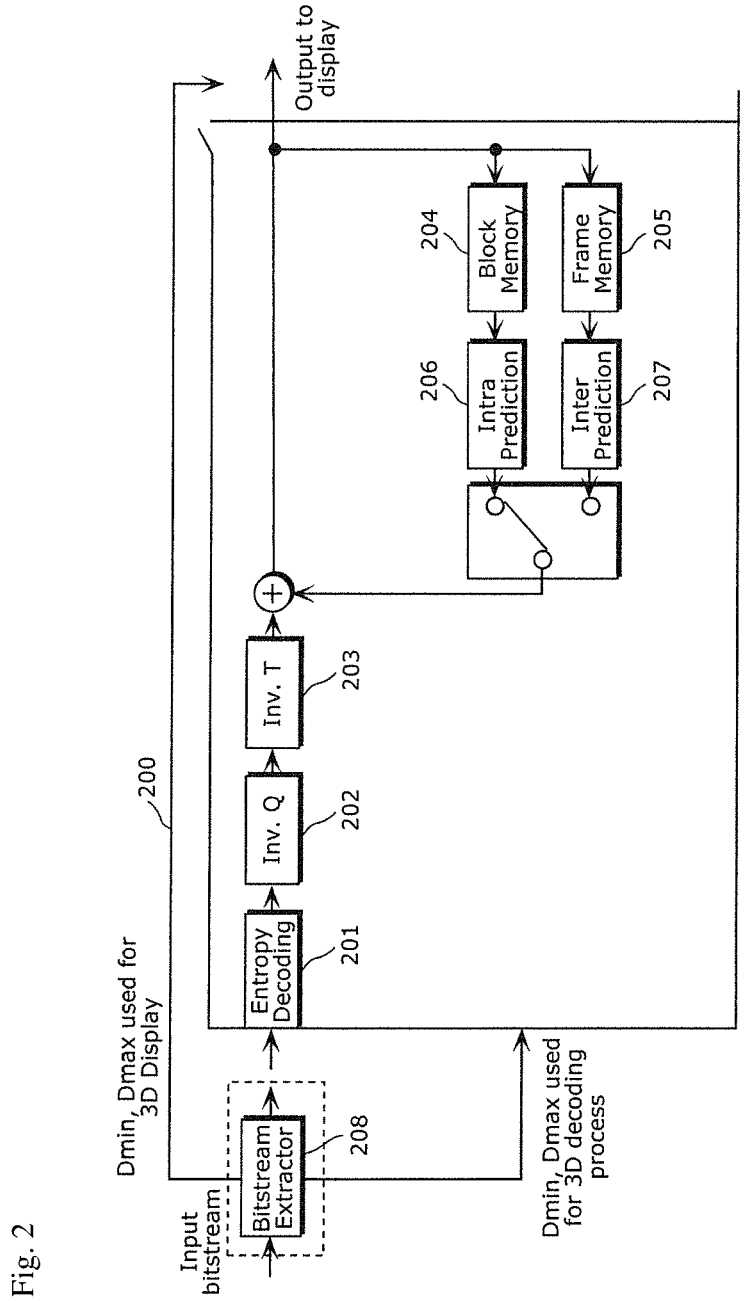
FIG. 2 shows a block diagram illustrating an example apparatus for a Bitstream Extractor and a video decoder of current invention.

FIG. 2 is a block diagram which shows a structure of video decoding apparatus 200 in an embodiment of the present invention.

The video decoding apparatus 200 is an apparatus for decoding an input coded bit stream on a block-by-block basis and outputting videos/images, and comprises as shown in FIG. 2, an entropy decoding unit 201, an inverse quantization unit 202, an inverse transformation unit 203, an block memory 204, a frame memory 205, an intra prediction unit 206, an inter prediction unit 207 and a sub bit stream extractor unit 208. In another possible embodiment of the present invention, the sub bit stream extractor unit 208 is another separate apparatus from the video decoding apparatus.

An input encoded bit stream is inputted to the bit stream extractor unit 208 and outputs a sub bit stream which goes to a standard decoding process started from the unit 201, also outputs Dmin and Dmax with other camera parameters, which go to the standard decoding process for decoding using the extracted 3D parameters and at the same time go to display side to ensure the coded or packaged 3D content could be presented to user with healthy 3D quality.

After the input encoded bit stream is inputted to the entropy decoding unit 201, the entropy decoding unit 201 decodes the input encoded bit stream, and outputs the decoded values to the inverse quantization unit 202. The inverse quantization unit 202 inversely quantizes the decoded values, and outputs frequency coefficients to the inverse transformation unit 203. The inverse transformation unit 203 performs inverse frequency transform on the frequency coefficients to transform the frequency coefficients into sample values, and outputs the resulting pixel values to an adder. The adder adds the resulting pixel values to the predicted video/image values outputted from the intra/inter prediction unit 206/207, outputs the resulting values to display, and outputs the resulting values to the block memory 204 or the frame memory 205 for further prediction. In addition, the intra/inter prediction unit 206/207 searches within videos/images stored in the block memory 204 or frame memory 205, and estimates a video/image area which is e.g. most similar to the decoded videos/images for prediction.

Figure 3A:
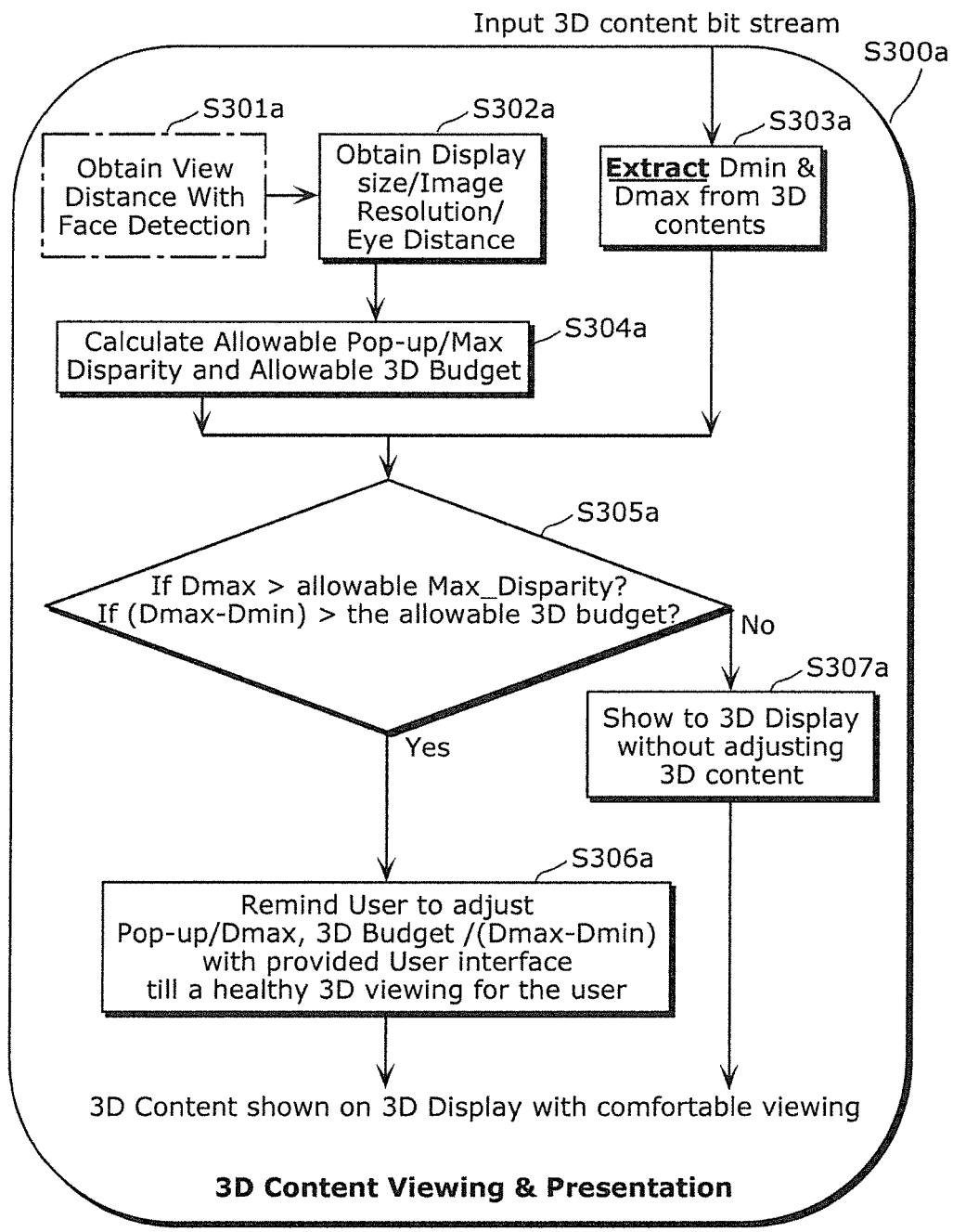
FIG. 3A shows a flowchart showing how extracted Dmin and Dmax are used to provide healthy 3D viewing at Decoder side, manually adjusted through UI.

FIG. 3A is a flowchart which shows a decoder and display terminal to extract and utilize the embedded Dmin and Dmax for 3D healthy viewing via 3D content adjustment manually by user, in an embodiment of the present invention.

The step of S301a is to obtain view distance/viewing_distance by any means, for example using face detection to locate the face of viewer then measure the distance from the viewer to the display either by software or distance measurement device, and the step of S302a is to obtain Image Resolution/image_width, Display Size/display_width, and Eye Distance which can be considered as fixed value, by user selection from TV parameter settings or automatically. The step of S303a is to extract the Dmin and Dmax which are carried in the 3D content stream or 3D packaged file.

The step of S304a is to calculate the allowable 3D pop-up which is corresponding to the maximum disparity, and the allowable 3D budget, where the calculation of the allowable maximum disparity is explained and illustrated in FIG. 4, and the allowable 3D budget can be obtained from the rule of 3D healthy viewing zones as shown in FIG. 13. According to the experience from 3D movie makers it can be set as −40 pixels for deep-in and +160 pixels for pop-up as the strong 3D effect for HD resolution on 30" screen.

The step of S305a is to check if the extracted Dmax from the 3D content coding stream or 3D content packaging file is greater than the allowable maximum disparity which is calculated based on the viewing parameters shown in FIG. 4, and if yes, then the 3D content needs to be adjusted to make the new Dmax be within the allowable range for pop-up, which is done in the step of S306a to remind user to adjust the pop-up extent themselves by using either remote controller or other User Interface like hand gesture. Otherwise the 3D content can be shown to the 3D display in the step of S307a without adjustment as it is able to provide healthy 3D viewing.

For more strict rule of 3D healthy viewing, the same checking is further done for the (Dmax-Dmin), and if it is greater than the allowable 3D budget, then goes to S306a for 3D budget adjustment to reduce the (Dmax-Dmin) to be within the allowable 3D budget, where the reduction of the value of (Dmax-Dmin) may require high quality depth with accurate values to perform 3D rendering based on the given depth and 3D budget. If (Dmax-Dmin) is less than the allowable 3D budget at the step of S305a, i.e. within the healthy 3D viewing budget, then goes to S307a to show the 3D content without adjustment.

Figure 3B:
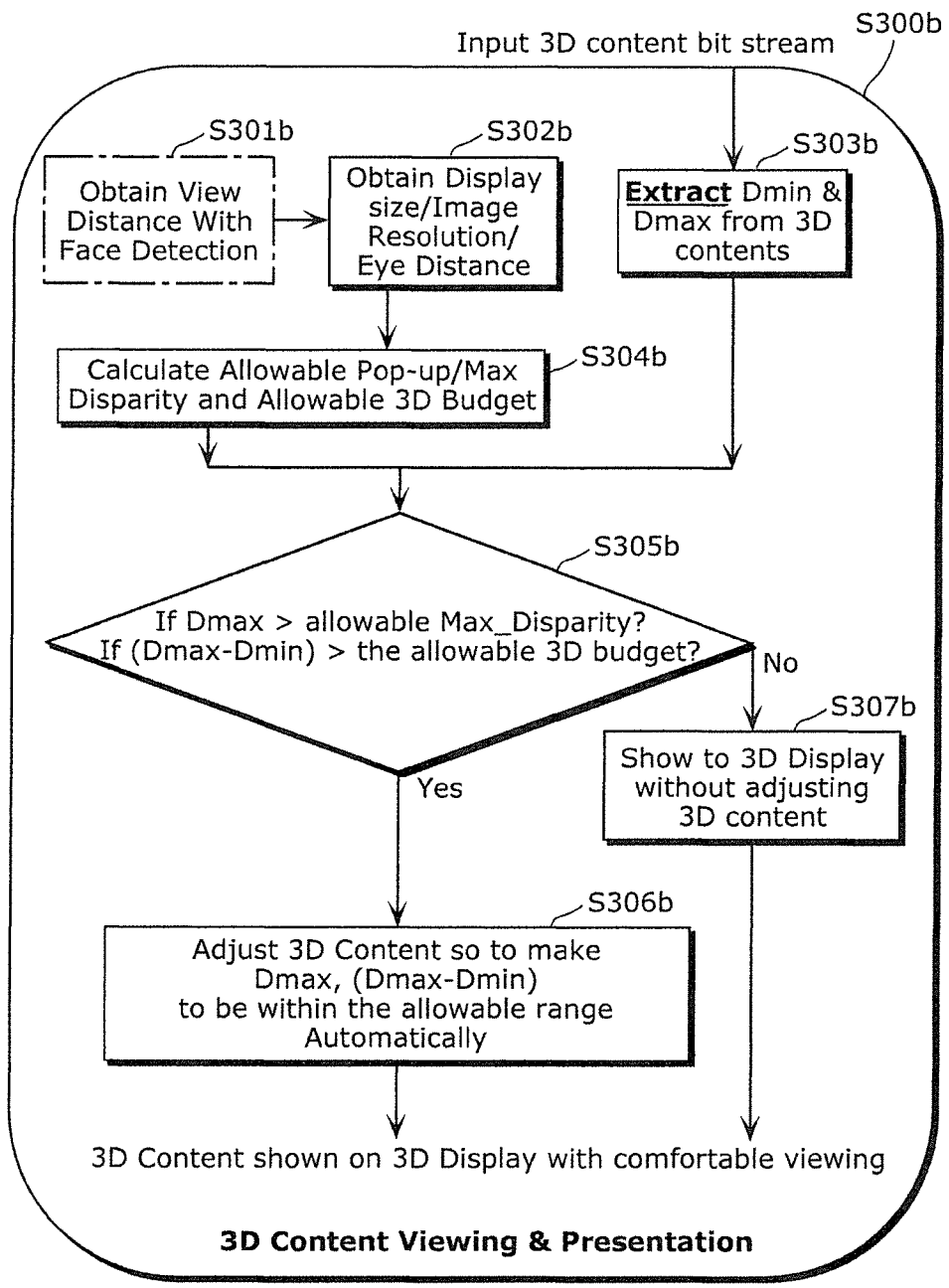
FIG. 3B shows a flowchart showing how extracted Dmin and Dmax are used to provide healthy 3D viewing at Decoder side in Automatic way.

FIG. 3B is a flowchart which shows a decoder and display terminal to extract and utilize the embedded Dmin and Dmax for 3D healthy viewing via 3D content adjustment automatically, in an embodiment of the present invention.

The step of S301b is to obtain view distance/viewing_distance by any means, for example using face detection to locate the face of viewer then measure the distance from the viewer to the display either by software or distance measurement device, and the step of S302b is to obtain Image Resolution/image_width, Display Size/display_width, and Eye Distance which can be considered as fixed value, by user selection from TV parameter settings or automatically. The step of S303b is to extract the Dmin and Dmax which are carried in the 3D content stream or 3D packaged file.

The step of S304b is to calculate the allowable 3D pop-up which is corresponding to the maximum disparity, and the allowable 3D budget, where the calculation of the allowable maximum disparity is explained and illustrated in FIG. 4, and the allowable 3D budget can be obtained from the rule of 3D healthy viewing zones as shown in FIG. 13. According to the experience from 3D movie makers it can be set as −40 pixels for deep-in and +160 pixels for pop-up as the strong 3D effect for HD resolution on 30" screen.

The step of S305b is to check if the extracted Dmax from the 3D content coding stream or 3D content packaging file is greater than the allowable maximum disparity which is calculated based on the viewing parameters shown in FIG. 4, and if yes, then the 3D content needs to be adjusted to make the new Dmax be within the allowable range for pop-up, which is done in the step of S306b automatically. Otherwise the 3D content can be shown to the 3D display in the step of S307 without adjustment as it is able to provide healthy 3D viewing.

For more strict rule of 3D healthy viewing, the same checking is further done for the (Dmax-Dmin), and if it is greater than the allowable 3D budget, then goes to S306b for 3D budget adjustment to reduce the (Dmax-Dmin) to be within the allowable 3D budget, where the reduction of the value of (Dmax-Dmin) may require high quality depth with accurate values to perform 3D rendering based on the given depth and 3D budget. If (Dmax-Dmin) is less than the allowable 3D budget at the step of S305b, i.e. within the healthy 3D viewing budget, then goes to S307b to show the 3D content without adjustment.

Figure 10:
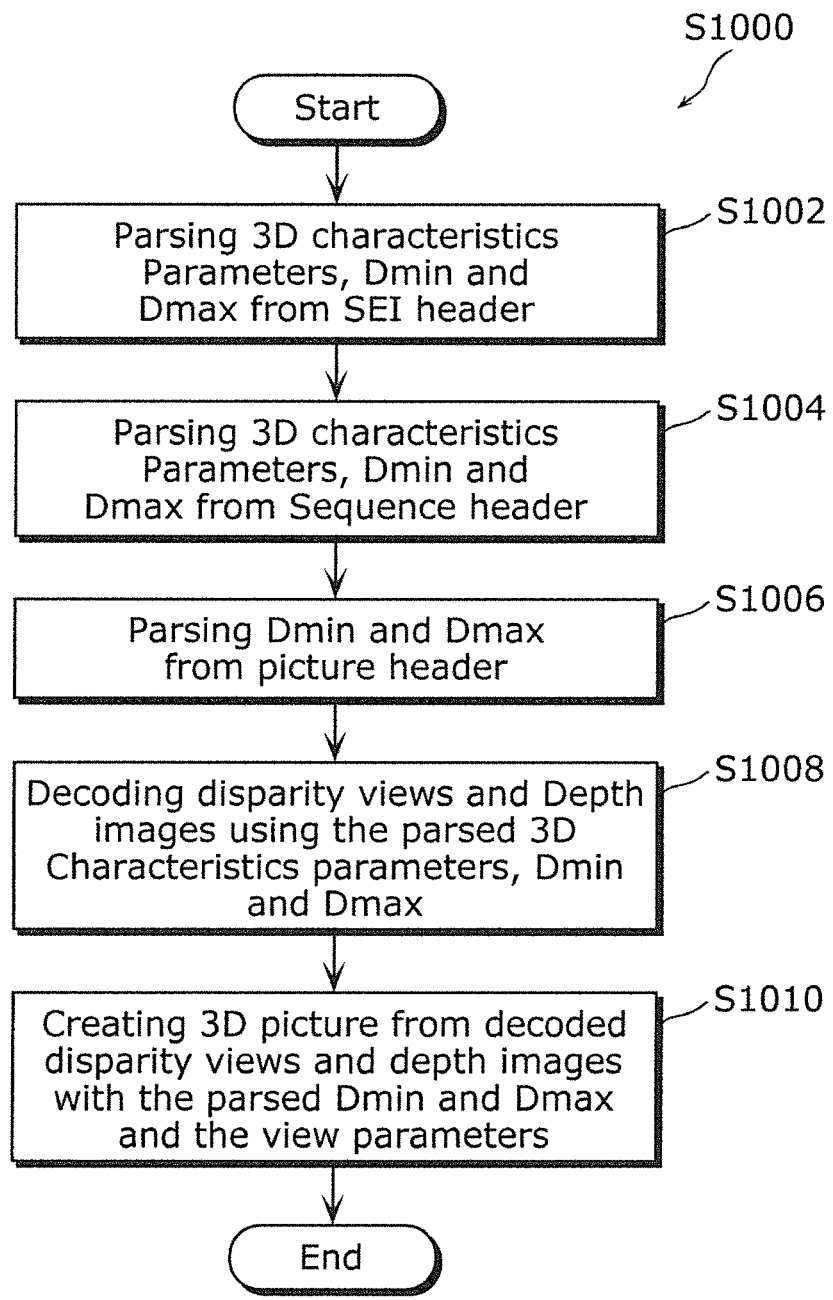
FIG. 10 shows a flowchart showing 3D content decoding process with Parsing and Utilizing camnera parameters and Dmin and Dmax.

FIG. 10 is a flowchart (S1000) which shows a sequence of operations for decoding method/steps of the video/image decoding apparatus 200 in the embodiment of the present invention.

At Step S1002 and S1004, camera parameters and Dmin and Dmax carried by SEI message and sequence header is parsed from the input 3D video stream, to use for decoding a sequence. At Step S1006. Dmin and Dmax carried in a picture header is parsed from the input 3D video stream, to apply for decoding each picture.

Then, at Step S1008, disparity views and depth images are decoded using the parsed camera parameters and Dmin and Dmax. And finally at Step S1010, a 3D picture is reconstructed and created from the decoded disparity views and decoded depth images with the parsed Dmin and Dmax and viewing parameters, where the final 3D picture or 3D video could be modified to ensure a healthy 3D viewing by using the parsed Dmin, Dmax and viewing parameters including viewing distance, display size and image resolution.

The effect of the current invention is to use Dmin and Dmax for efficient coding and carry Dmin and Dmax in the 3D coded streams for healthy 3D viewing.

Embodiment: Decoding Flowchart for 3D Photo Slide Show

Figure 11:
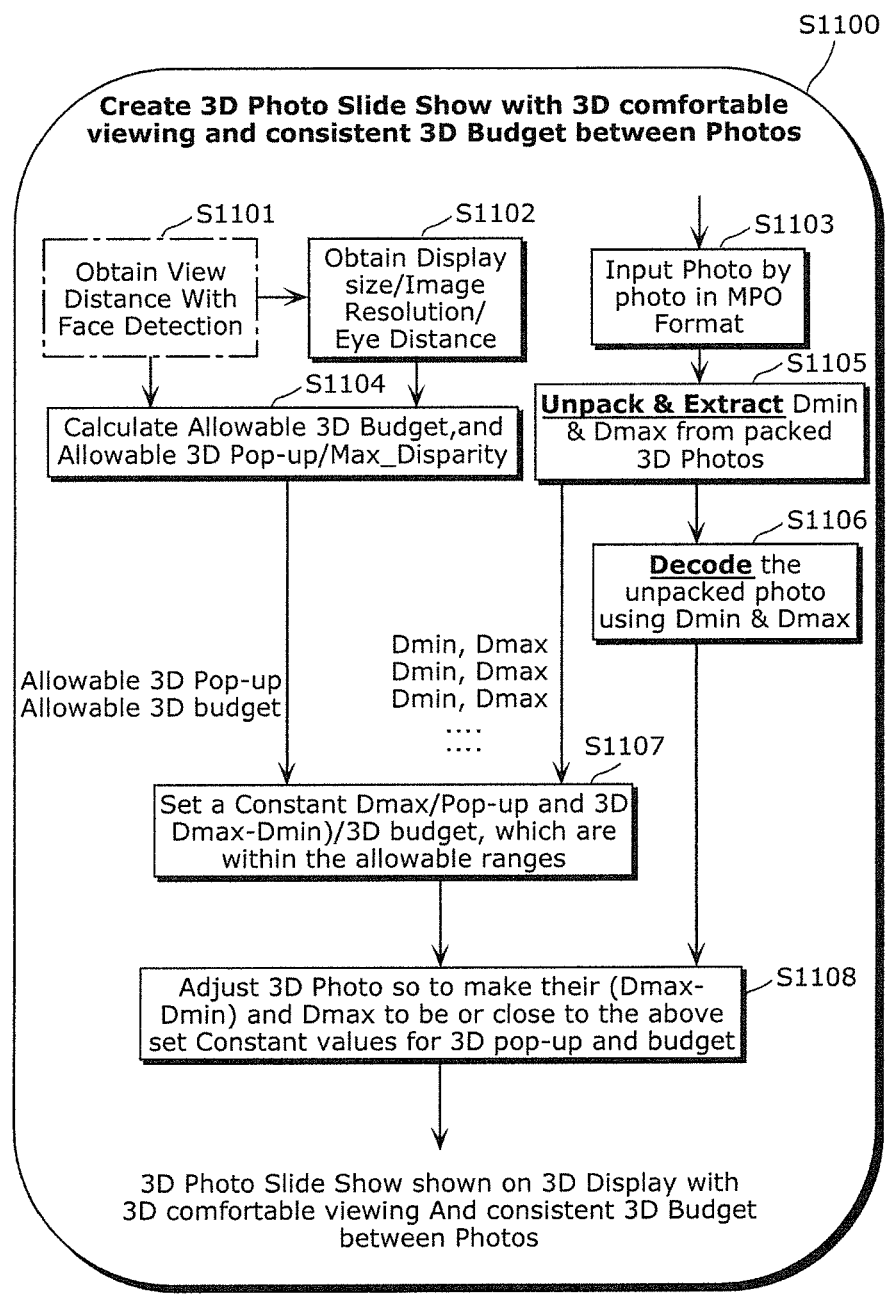
FIG. 11 shows a flowchart showing Dmin and Dmax used for Healthy 3D Slide Show at terminal side.

FIG. 11 is a flowchart which shows a decoder and display terminal to extract and utilize the embedded Dmin and Dmax for a 3D Photo Slide Show in an embodiment of the present invention.

The step S1101 is to obtain view distance/viewing_distance by any means, for example using face detection to locate the face of viewer then measure the distance from the viewer to the display either by software or distance measurement device. The step of S1102 is to obtain Image Resolution/image_width, Display Size/display_width, and Eye Distance which can be considered as fixed value.

The step of 1103 is to input photo by photo in their MPO packaging format, where camera parameters and Dmin and Dmax are embedded, then the step of S1105 is to unpack and extract the embedded camera parameters including Dmin and Dmax for decoding process and healthy 3D Slide Show. The step of S1106 is to decode the unpacked 3D Photo file into pairs of single views/pictures.

The step of S1104 is to calculate the allowable 3D pop-up which is corresponding to the maximum disparity, and the allowable 3D budget, where the calculation of the allowable maximum disparity is explained and illustrated in FIG. 4, and the allowable 3D budget can be obtained from the rule of 3D healthy viewing zones as shown in FIG. 13. It can be set as −40 pixels for deep-in and +160 pixels for pop-up as the strong 3D effect for HD resolution on 30" screen.

The step of S1107 is to set a constant and fixed (Dmax-Dmin) and a constant and fixed Dmax as the center values for all the photos, where such center values plus a delta should be within the range guarded by the allowable maximum disparity and the allowable 3D budget calculated in the step of S1104.

The step of S1108 is to make the adjustment of the pair of decoded views so that their new (Dmin-Dmax) and Dmax are the same or close to the center values which are set in the step of S1107. The new (Dmax-Dmin) and the new Dmax of each photo can be up and down from the center values but the final values are still within the allowable range and also with a small delta change among the neighbor pictures which are arranged for slide show in time domain.

The effect of the current invention is to use camera parameters including Dmin and Dmax for efficient coding and extract camera parameters including Dmin and Dmax in the packaged 3D photo like MPO format for healthy 3D Photo viewing or healthy 3D Photo Slide Show.

Embodiment: Flowchart for 3D Content Capturing with Default Dmin and Dmax

Figure 12:
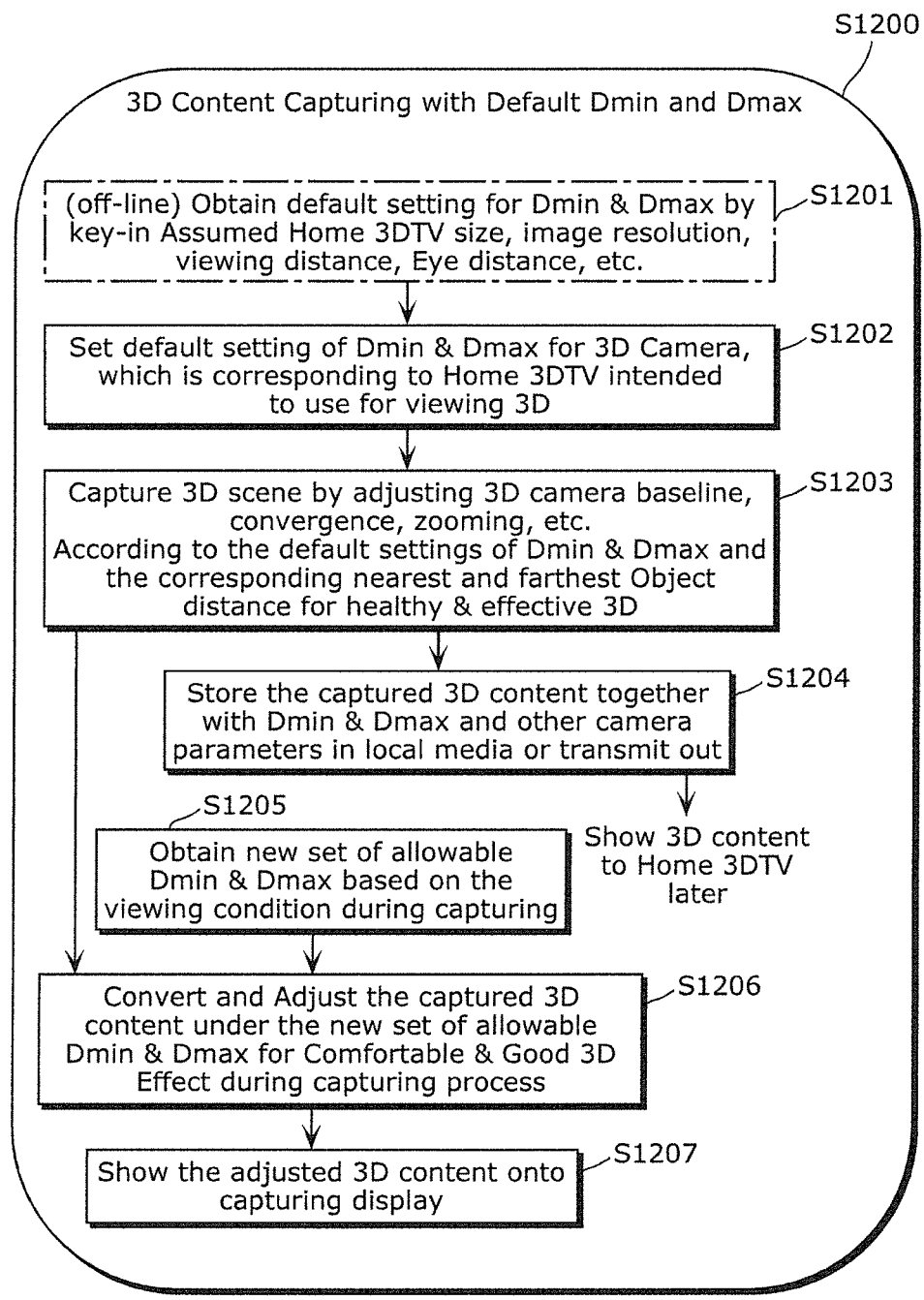
FIG. 12 shows a flowchart showing 3D Content Capturing with Dmin/Dmax Mapping with actual viewing condition.

FIG. 12 is a flowchart as the unit S1200, which shows 3D content capturing with default Dmin and Dmax which is corresponding to the actual 3D viewing conditions, and at the same time Dmin and Dmax are mapped to the allowable Dmin and Dmax which brings comfortable and effective 3D viewing even under different viewing condition at capturing side.

The step S1201 is to obtain Dmax and 3D budget/(Dmax-Dmin) off-line once based on FIGS. 4 and 12, so that such Dmin and Dmax are within the allowable range to bring healthy 3D viewing at home for example, or for 3D viewing in the movie theatre, etc. Such Dmin and Dmax are calculated based on the specific viewing conditions like display size, image resolution, and estimated viewing distance, etc. By keying in such viewing parameters to the capturing device, the Dmin and Dmax are obtained as default settings for your future capturing.

The step S1202 is for user to choose the default settings from the camera menu so to use the default Dmin and Dmax to guard the 3D capturing process, to make sure the captured 3D is within the allowable Dmin and Dmax for healthy viewing at home or movie theatre later.

The step S1203 is to adjust capturing device, like stereo/3D camera baseline, convergence angle, zoom etc. to make sure the actual maximum and minimum Disparity for the scene should be within the ranges guarded by the default Dmax and 3D budget/(Dmax -Dmin). The step S1204 is to store the captured 3D content in local media together with the real Dmin and Dmax and other camera parameters, or transmit out for showing 3D content on 3D display.

The step S1205 is to convert the default setting of Dmin and Dmax into the Dmin and Dmax which is corresponding to viewing with 3D camera screen based on the corresponding view distance, capturing and viewing display size and image resolution, etc., or such Dmin and Dmax can be obtained by using FIGS. 4 and 12 based on the viewing conditions at the capturing side. The step S1206 is to adjust the captured 3D content using the Dmin and Dmax obtained in the step S1205 just for comfortable and effective 3D viewing on capturing display purpose.

Embodiment(III):

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 14:
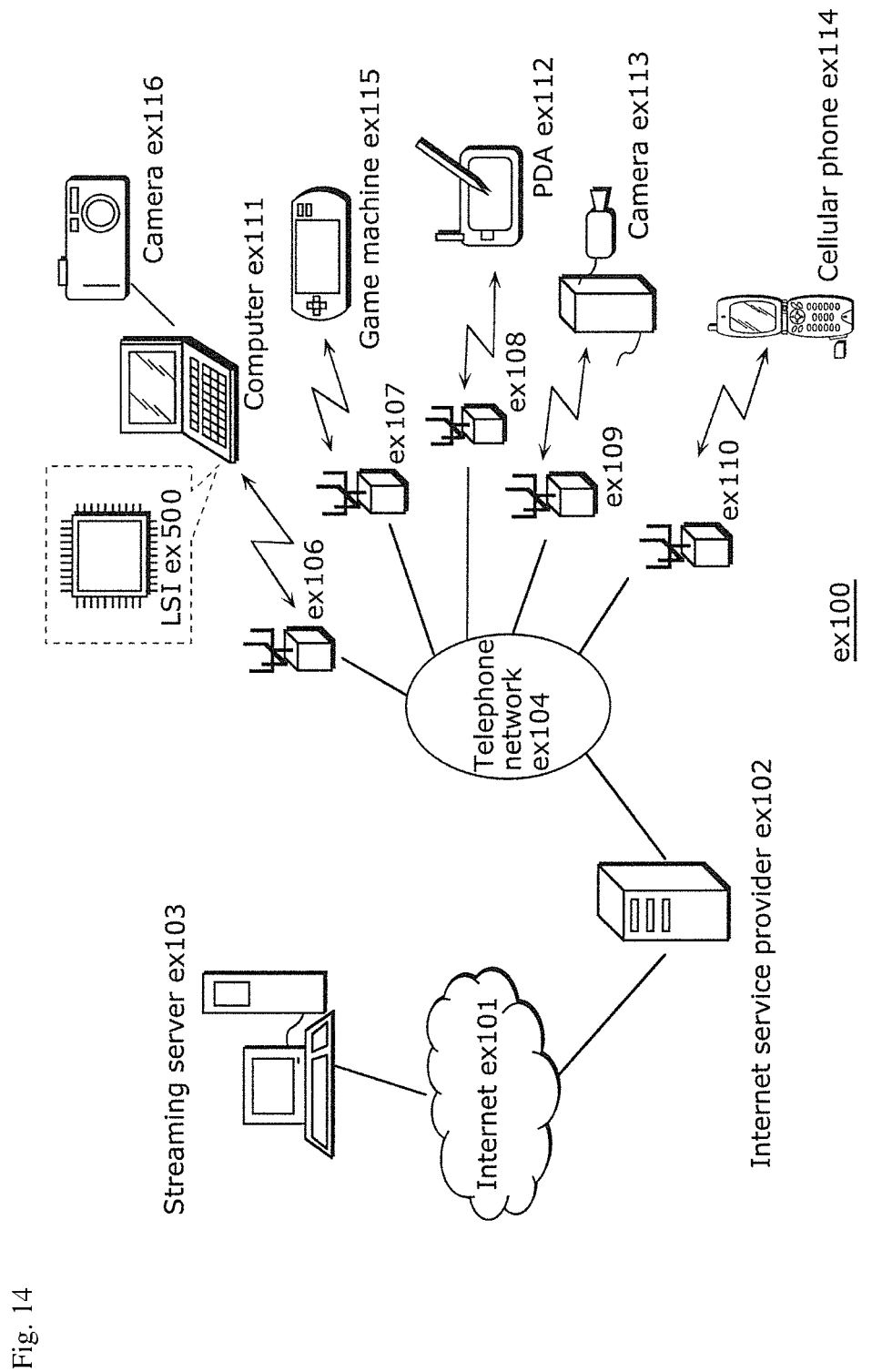
FIG. 14 shows an overall configuration of a content providing system for implementing content distribution services.

FIG. 14 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 14, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111.

The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 15:
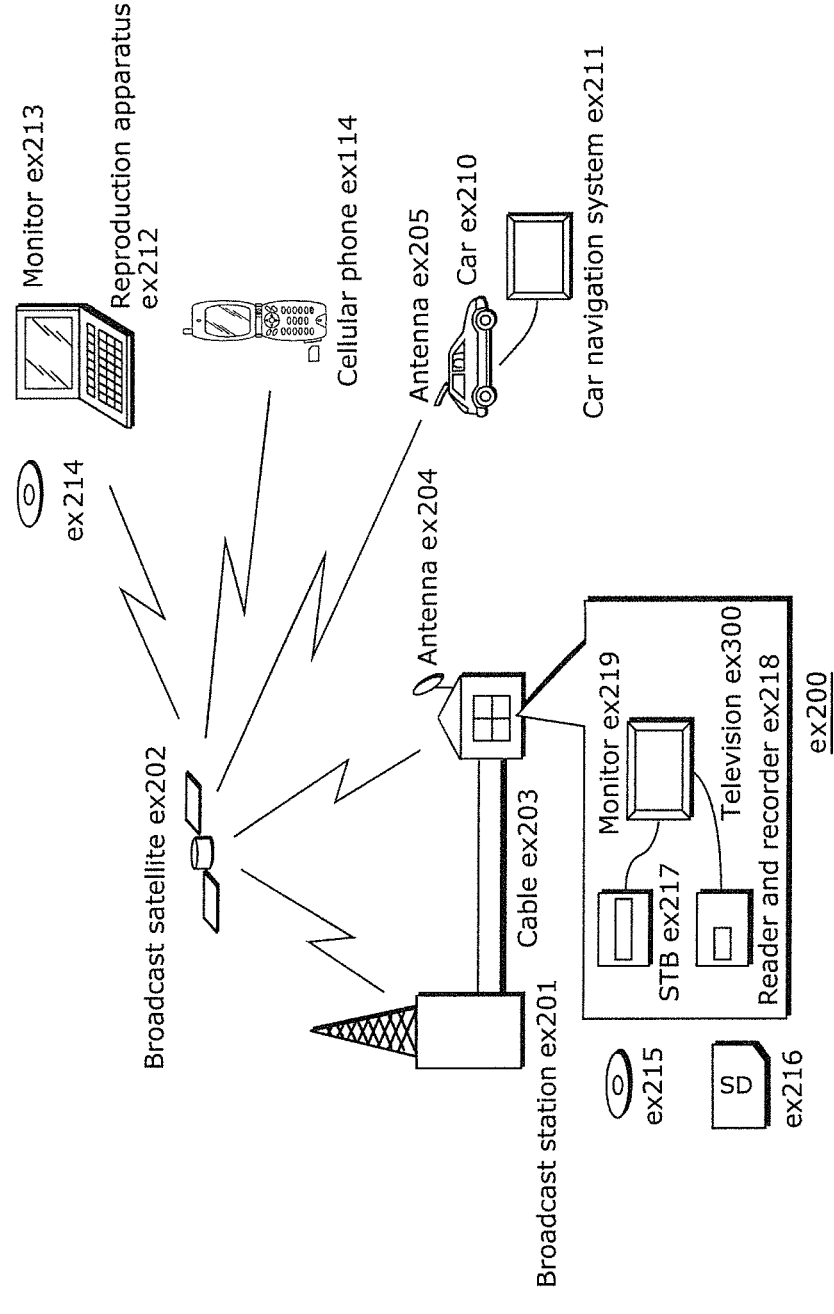
FIG. 15 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 15. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 16:
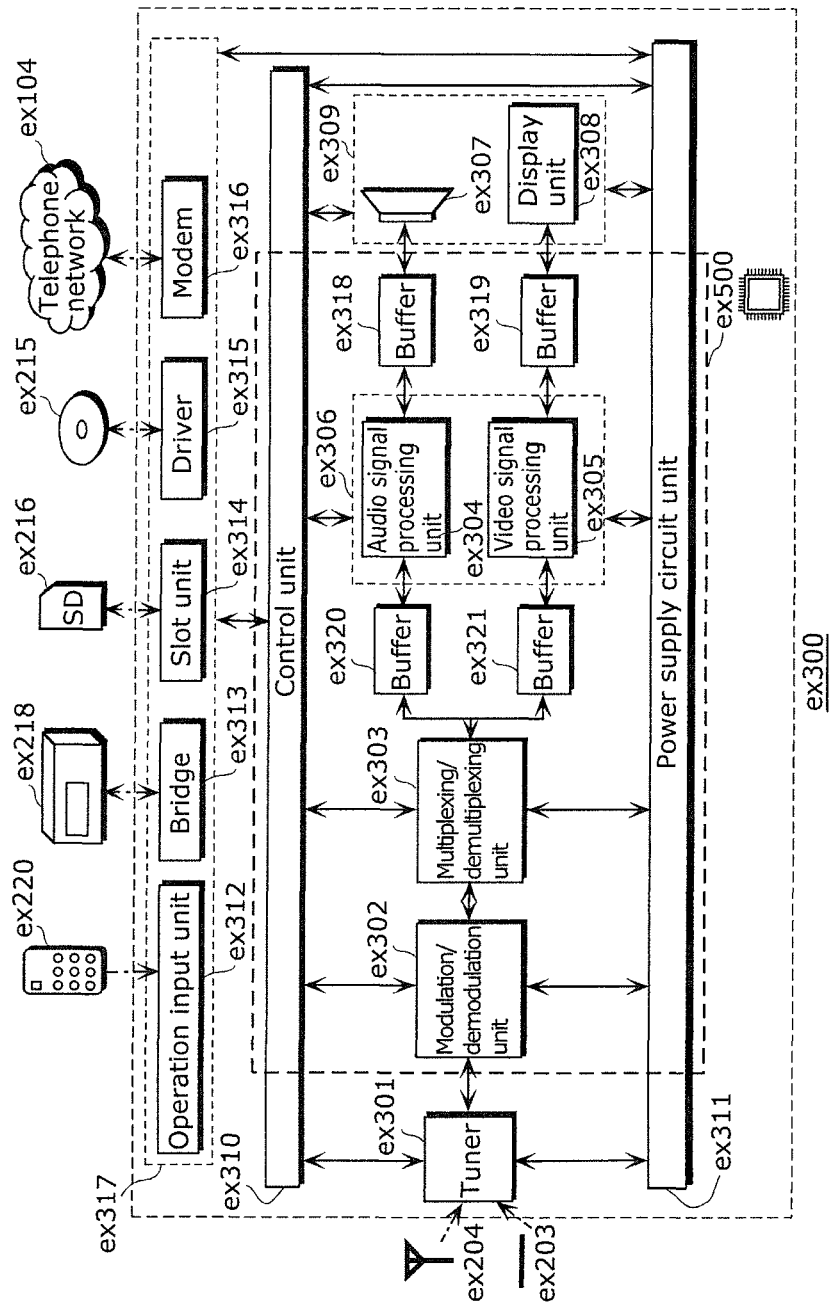
FIG. 16 shows a block diagram illustrating an example of a configuration of a television.

FIG. 16 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 17:
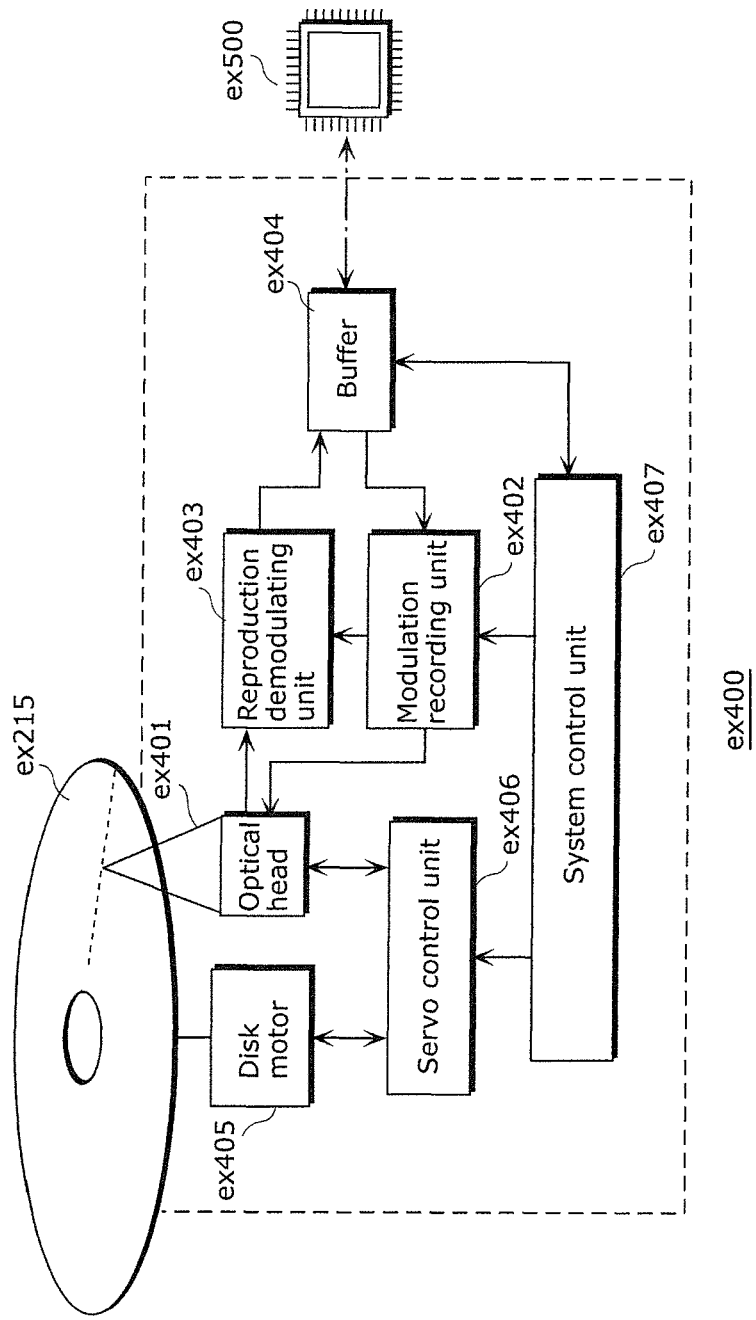
FIG. 17 shows a block diagram illustrating an example of a configuration of an information reproducing/recording unit that reads and writes information from and on a recording medium that is an optical disk.

As an example, FIG. 17 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 18:
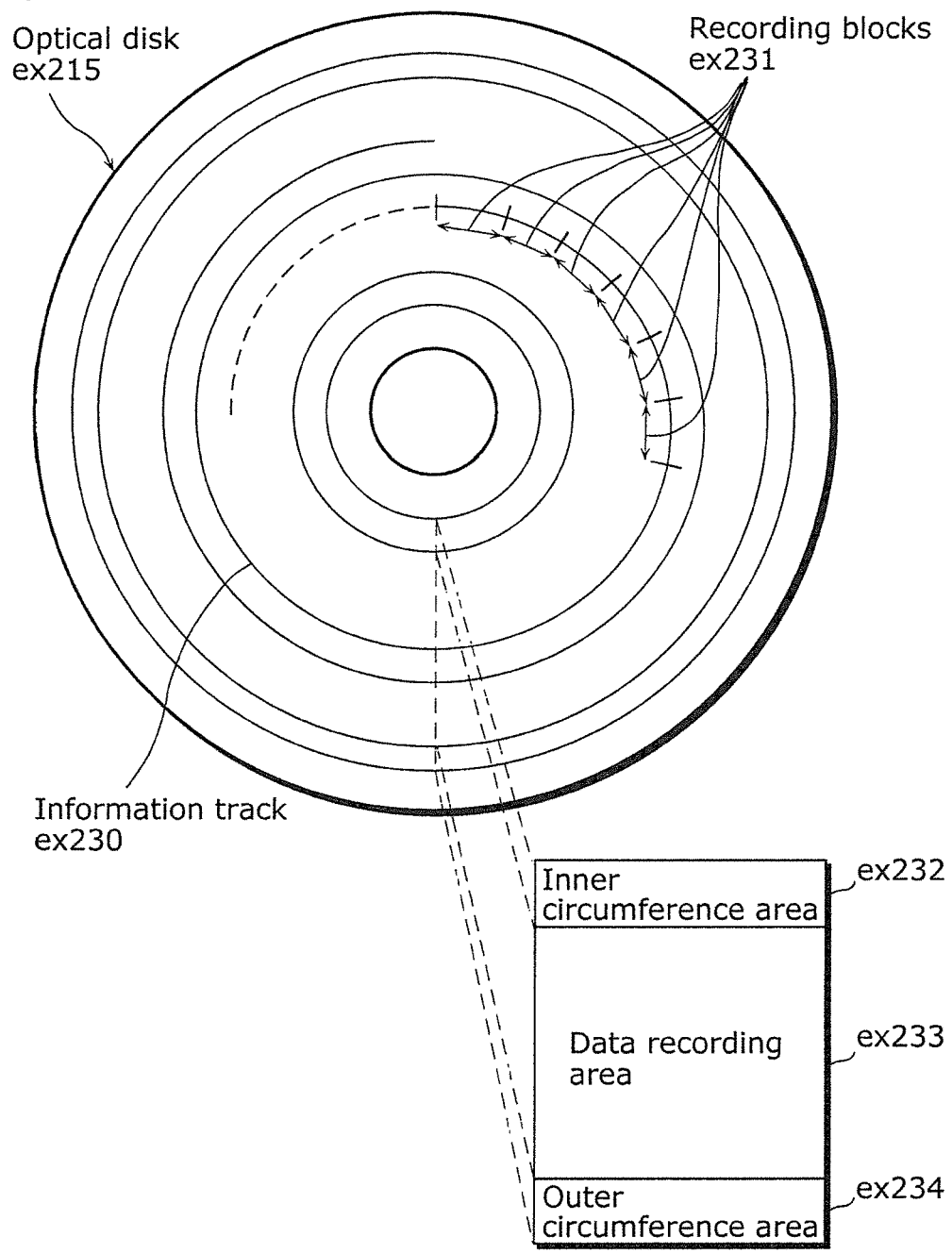
FIG. 18 shows an example of a configuration of a recording medium that is an optical disk.

FIG. 18 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200). Here, a configuration of the car navigation system ex211 will be a configuration, for example, including a GPS receiving unit from the configuration illustrated in FIG. 16. The same will be true for the configuration of the computer ex111, the cellular phone ex114, and others.

Figure 19A:
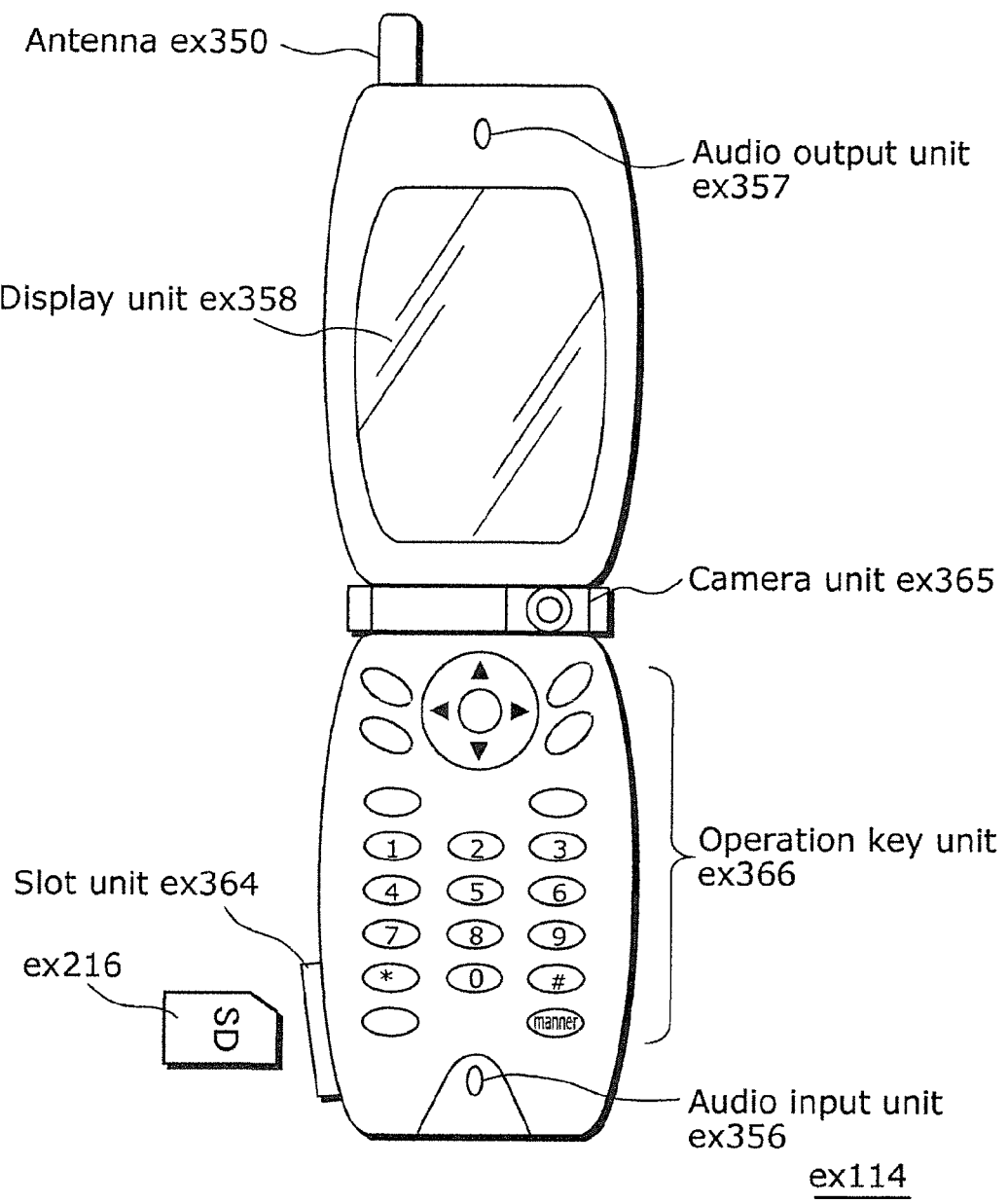
FIG. 19A shows an example of a cellular phone.

FIG. 19A illustrates the cellular phone ext114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 19B:
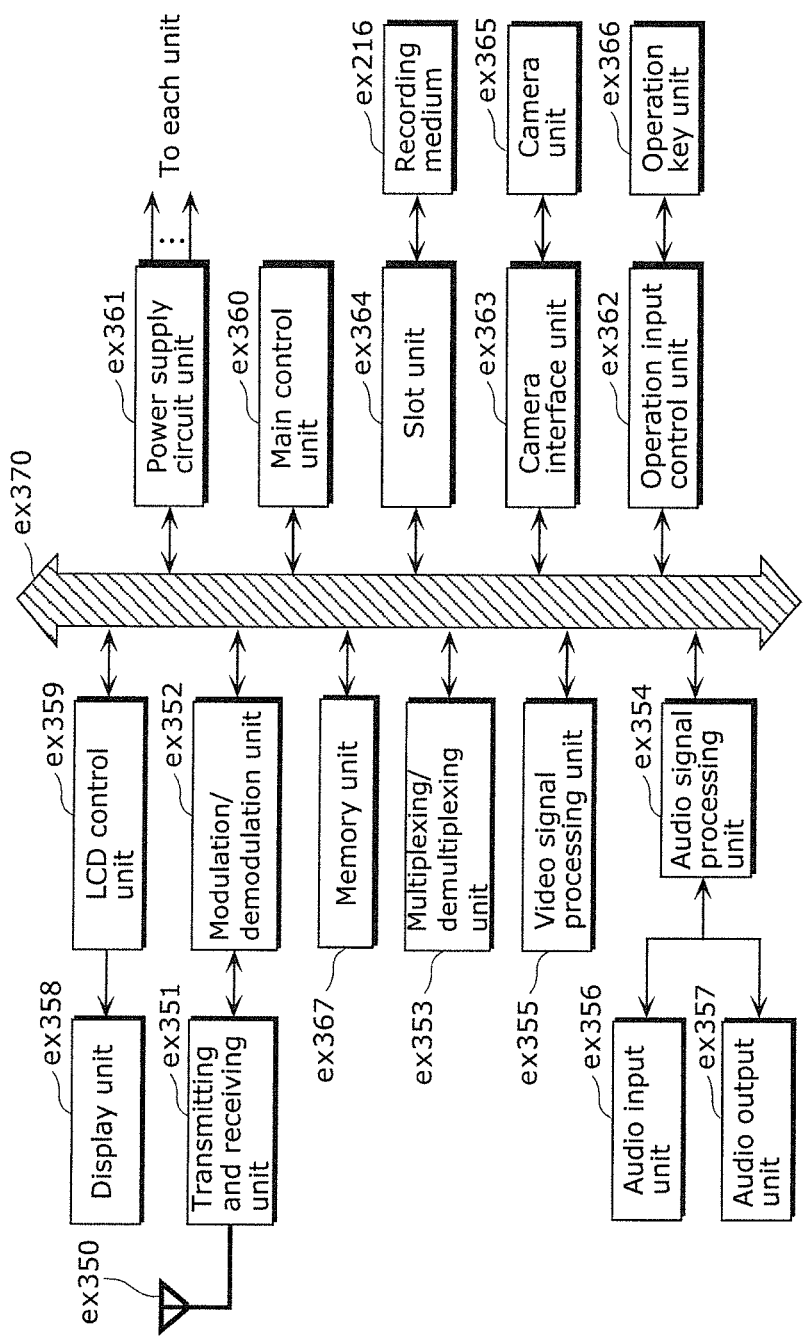
FIG. 19B is a block diagram showing an example of a configuration of a cellular phone.

Next, an example of a configuration of the cellular phone ex114 will be described with reference to FIG. 19B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably has 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data, but character data related to video onto video data, and may not be multiplexed data, but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment(IV):

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The nmultiplexed data is a digital streamn in the MPEG-2 Transport Stream format.

FIG. 20 illustrates a structure of the multiplexed data. As illustrated in FIG. 20, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 21:
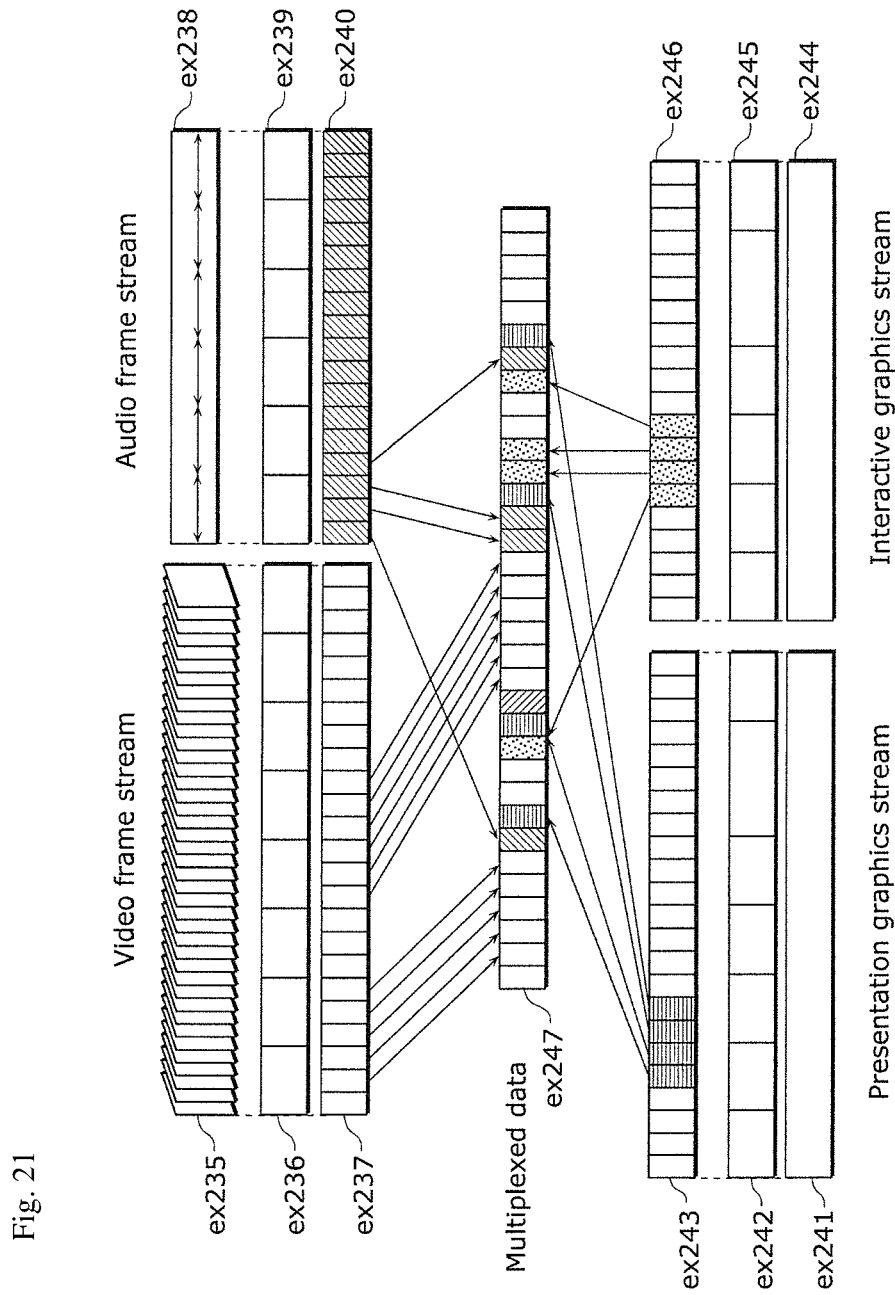
FIG. 21 schematically shows how each stream is multiplexed in multiplexed data.

FIG. 21 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 22:
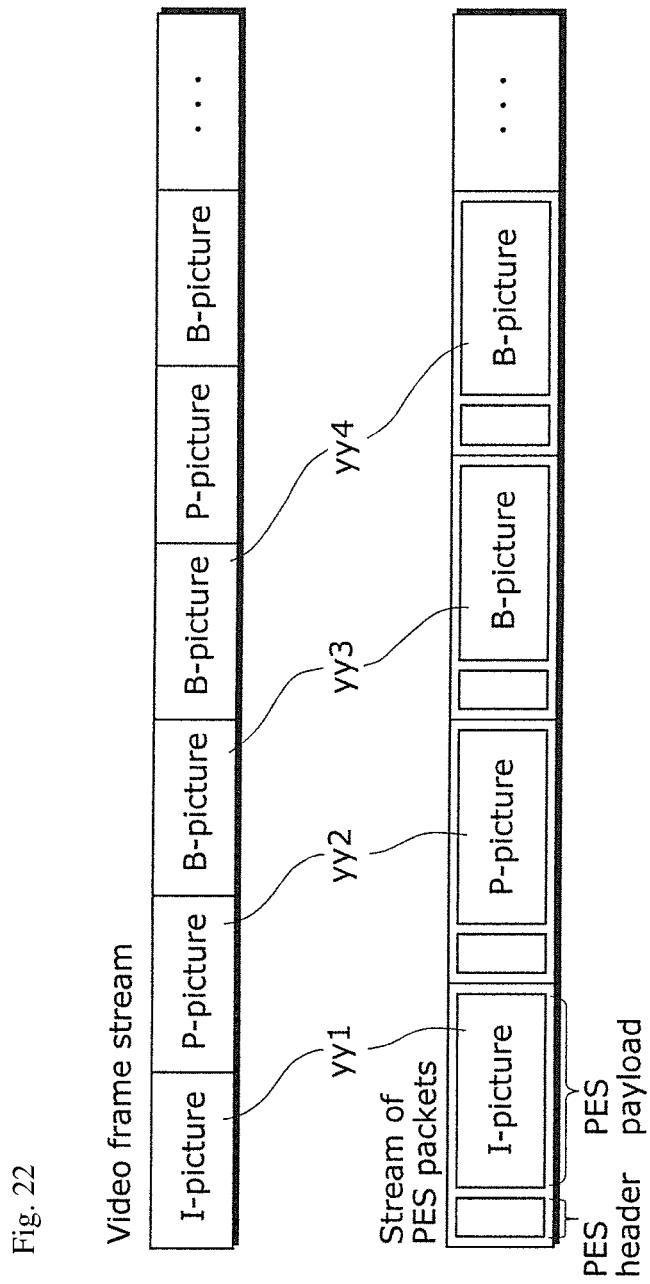
FIG. 22 shows how a video stream is stored in a stream of PES packets in more detail.

FIG. 22 illustrates how a video stream is stored in a stream of PES packets in more detail. The first bar in FIG. 22 shows a video frame stream in a video stream. The second bar shows the stream of PES packets. As indicated by arrows denoted as yy1, yy2, yy3, and yy4 in FIG. 22, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 23:
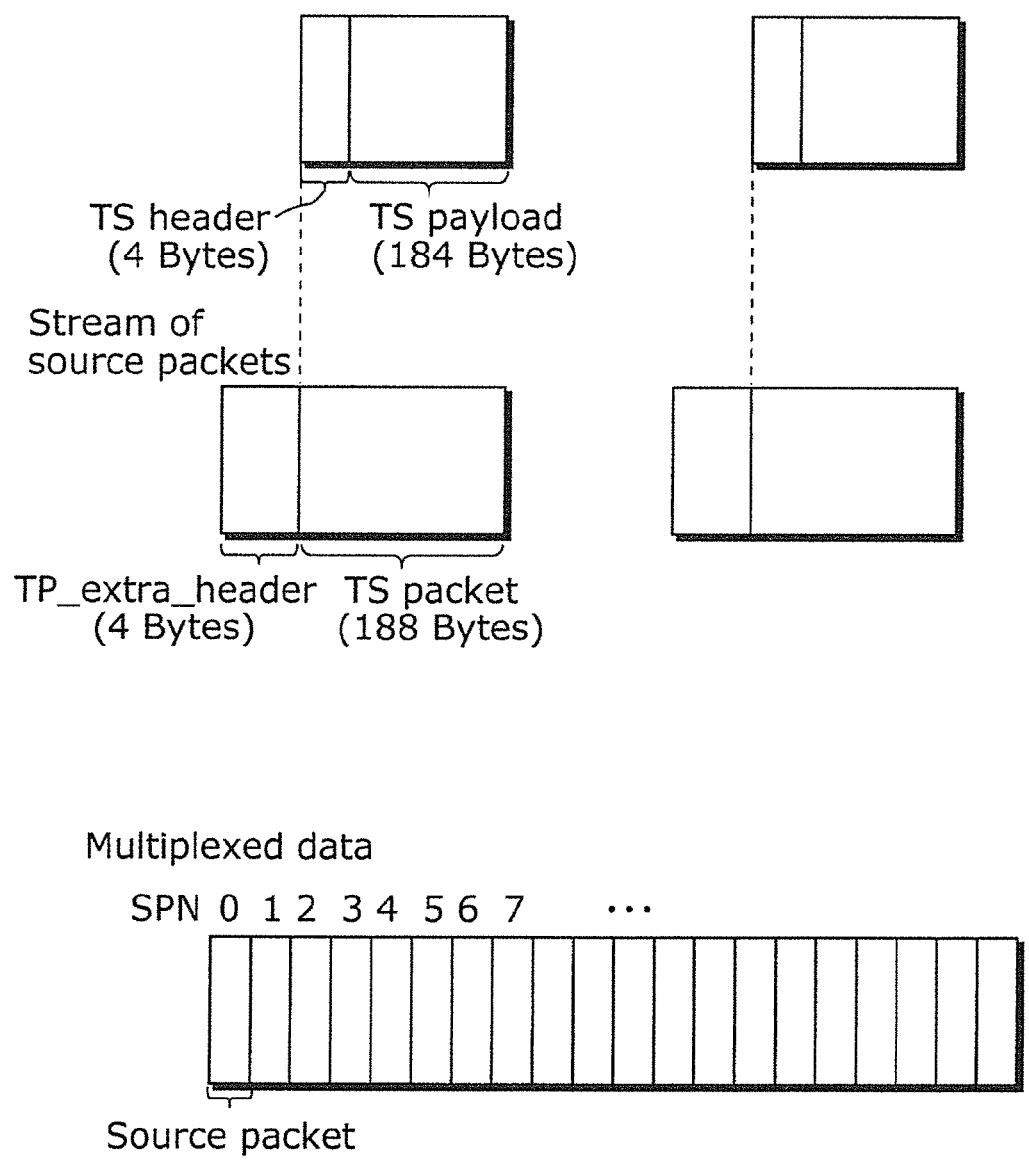
FIG. 23 shows a structure of TS packets and source packets in the multiplexed data.

FIG. 23 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 23. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 24:
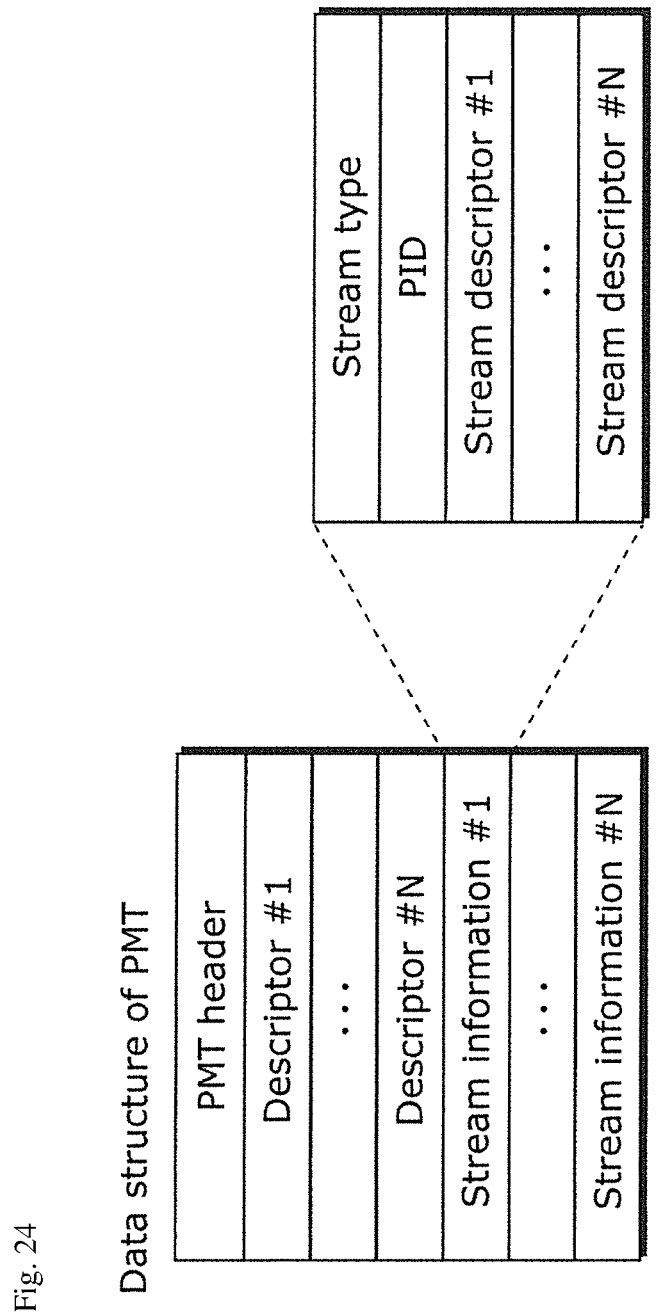
FIG. 24 shows a data structure of a PMT.

FIG. 24 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 25:
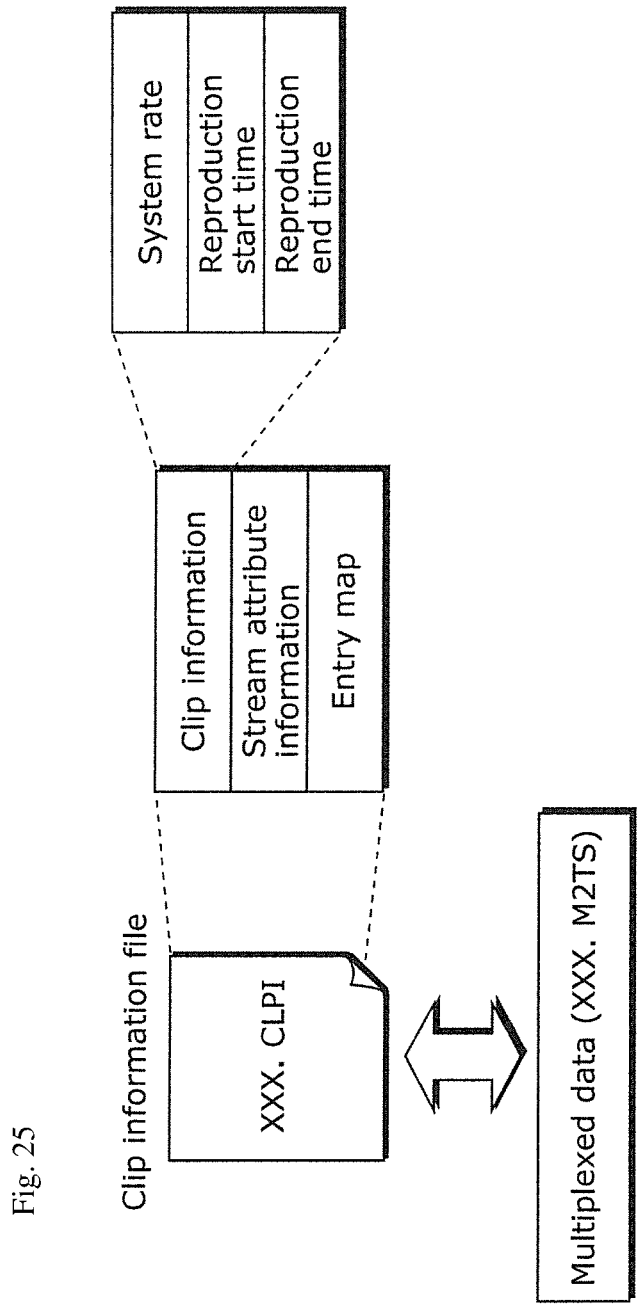
FIG. 25 shows an internal structure of multiplexed data information.

Each of the multiplexed data information files is management information of the multiplexed data as shown in FIG. 25. The multiplexed data information files are in one to one correspondence with the multiplexed data, and each of the files includes multiplexed data information, stream attribute information, and an entry map.

As illustrated in FIG. 25, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 26:
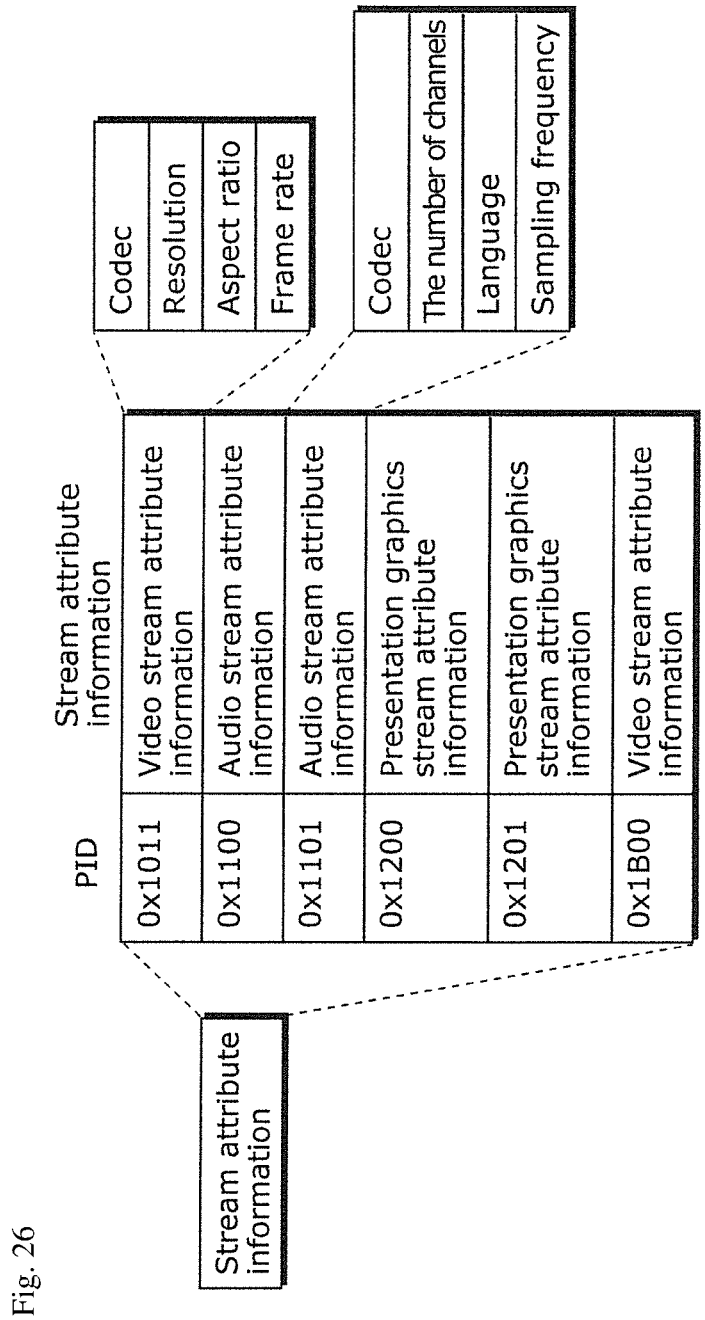
FIG. 26 shows an internal structure of stream attribute information.

As shown in FIG. 26, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 27:
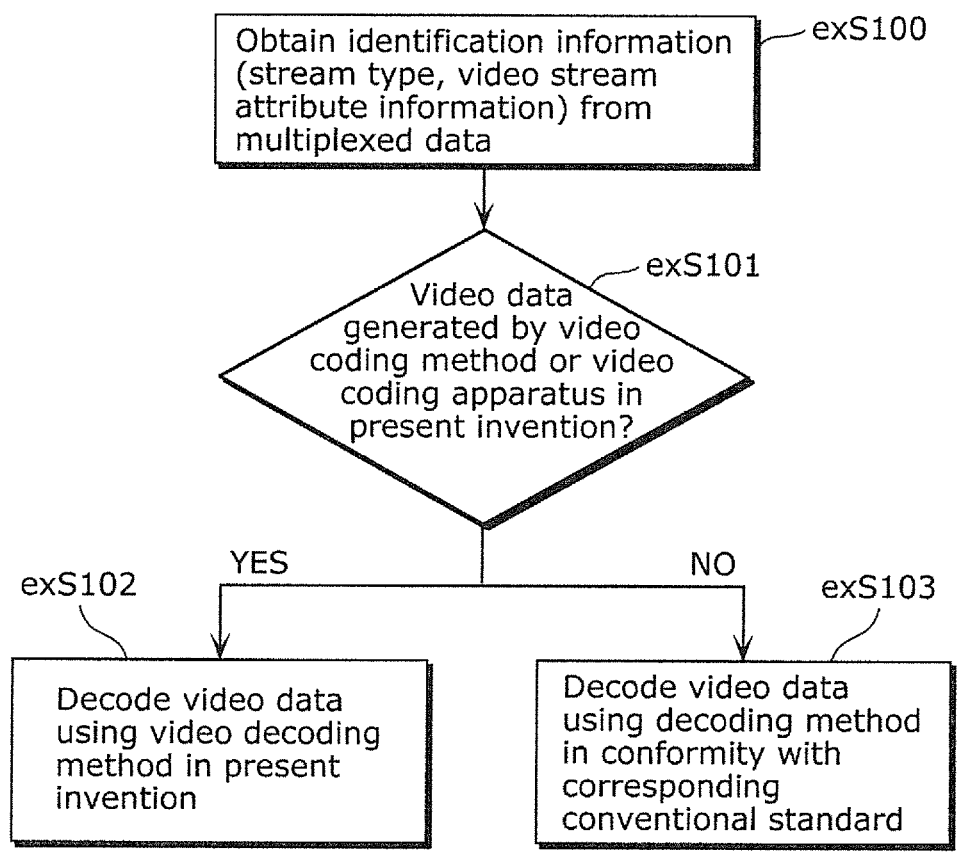
FIG. 27 shows steps for identifying video data.

Furthermore, FIG. 27 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Figure 28:
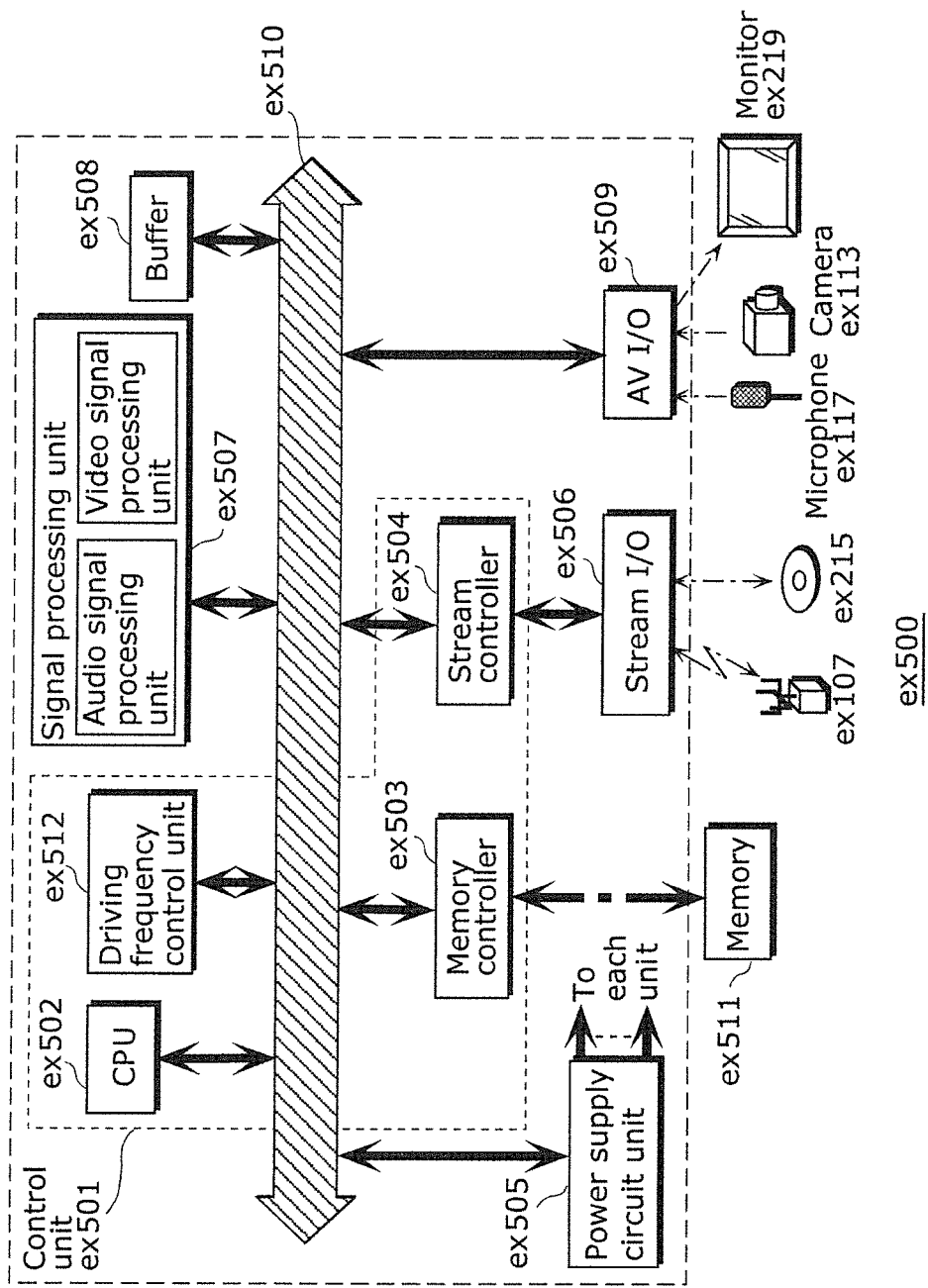
FIG. 28 shows an example of a configuration of an integrated circuit for implementing the moving picture coding method and the moving picture decoding method according to each of embodiments.

Embodiment(V):

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 28 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by loading or reading a program from a memory or the like one or more programs that are included in software or firmware.

In the future, with advancement in semiconductor technology, a brand-new technology may replace LSI. The functional blocks can be integrated using such a technology. The possibility is that the present invention is applied to biotechnology.

Embodiment(VI):

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 29:
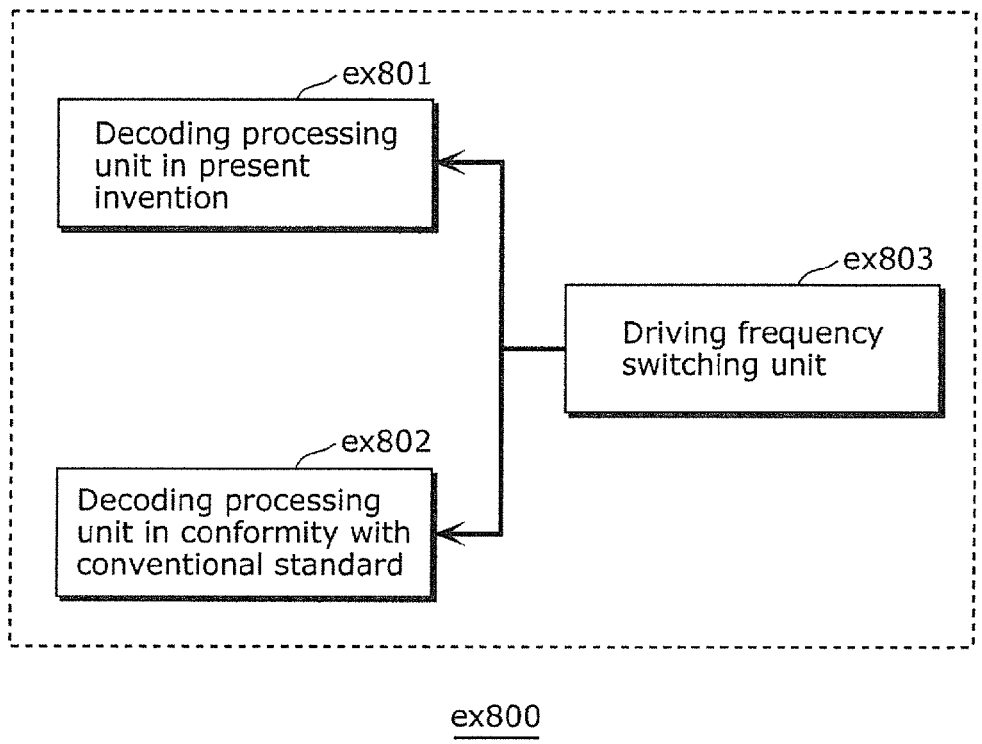
FIG. 29 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 29 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

Figures 31, 32A:
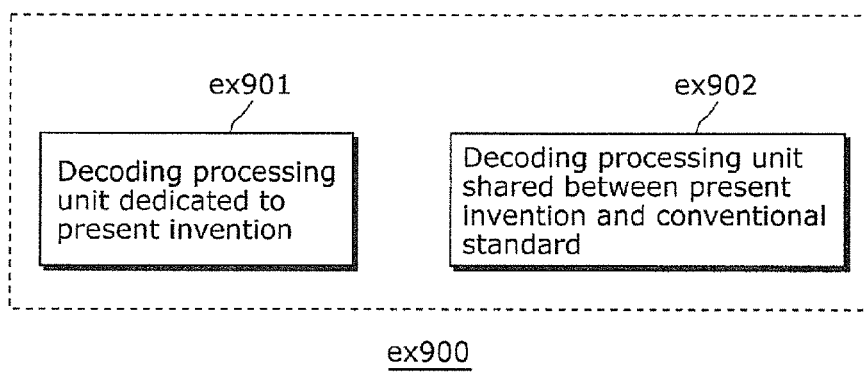
FIG. 31 shows an example of a look-up table in which video data standards are associated with driving frequencies.
FIG. 32A is a diagram showing an example of a configuration for sharing a module of a signal processing unit.

More specifically, the driving frequency switching unit ex803 includes the CPU ex502 and the driving frequency control unit ex512 in FIG. 28. Here, each of the decoding processing unit ex801 that executes the moving picture decoding method described in each of embodiments and the decoding processing unit ex802 that conforms to the conventional standard corresponds to the signal processing unit ex507 in FIG. 28. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment(IV) is probably used for identifying the video data. The identification information is not limited to the one described in Embodiment(IV) but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 31. The driving frequency can be selected by storing the look-up table in the buffer ex508 and in an internal memory of an LSI, and with reference to the look-up table by the CPU ex502.

Figure 30:
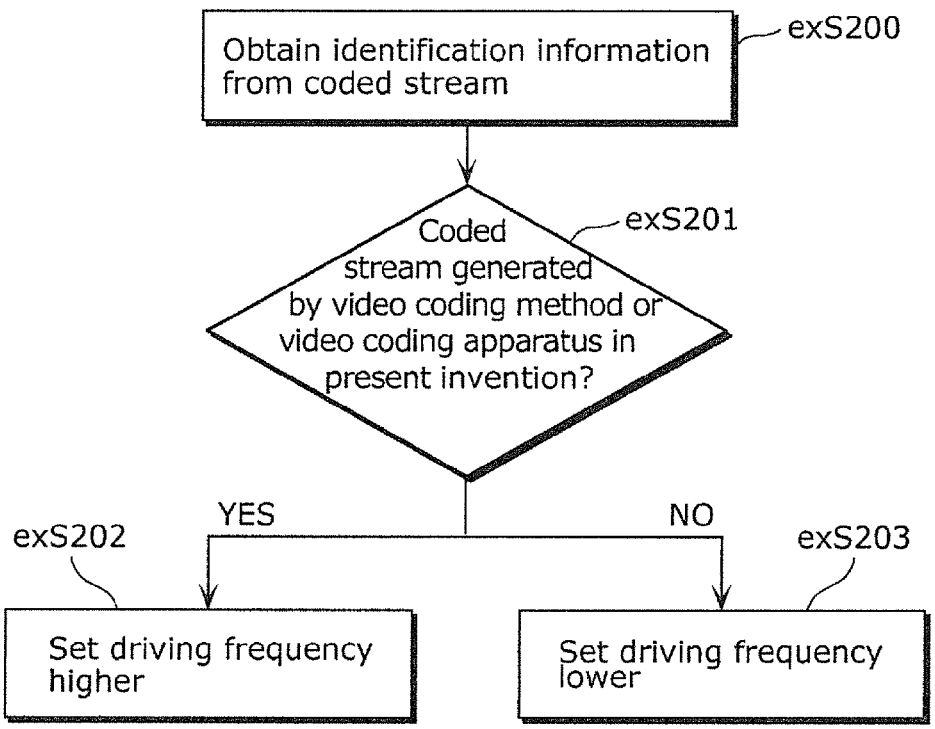
FIG. 30 shows steps for identifying video data and switching between driving frequencies.

FIG. 30 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2. MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment(VII):

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 32A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 32B:
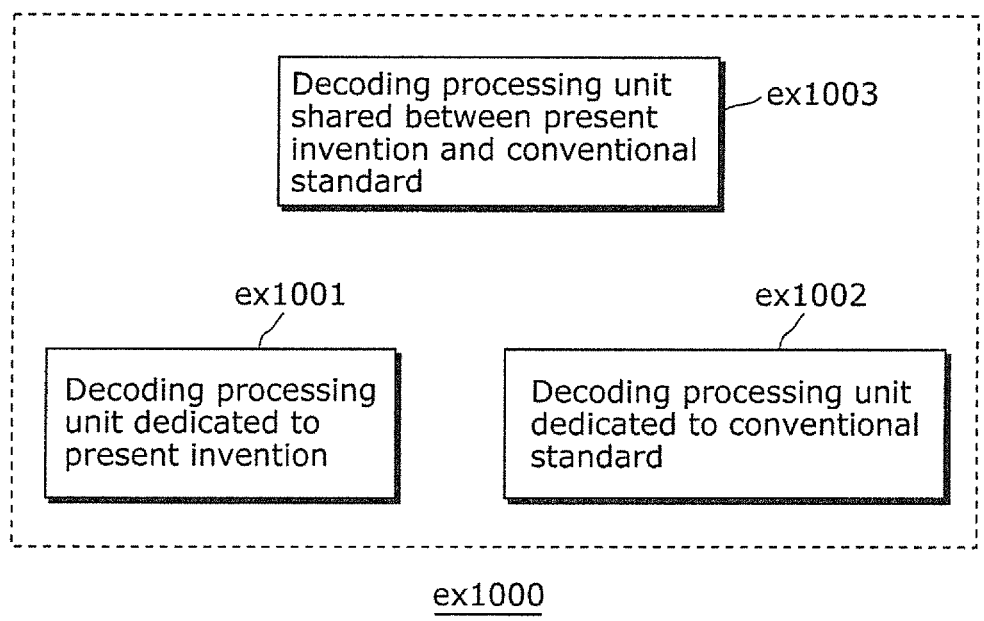
FIG. 32B is a diagram showing another example of a configuration for sharing a module of the signal processing unit.

Furthermore, ex1000 in FIG. 32B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

The invention claimed is:

1. A method of encoding a 3D video or a 3D image with 3D characteristics parameters, comprising:

determining a minimum disparity/Dmin, and a maximum disparity/Dmax for a current picture from 3D input data;

analyzing changes of the minimum disparity/Dmin and the maximum disparity/Dmax between the current picture and a following picture;

writing both the minimum disparity/Dmin and the maximum disparity/Dmax into a corresponding picture header of a video stream when (i) the minimum disparity/Dmin is different from another minimum disparity/Dmin for the following picture and (ii) the maximum disparity/Dmax is different from another maximum disparity/Dmax for the following picture, according to the analyzing, and writing both the minimum disparity/Dmin and the maximum disparity/Dmax into a sequence header of the video stream if both the minimum disparity/Dmin and the maximum disparity/Dmax are the same as the another minimum disparity/Dmin and the another maximum disparity/Dmax for the following picture, respectively, according to the analyzing; and encoding the current picture with the minimum disparity/Dmin and the maximum disparity/Dmax.

* * * * *